(12) United States Patent
Kim et al.

(10) Patent No.: US 12,346,153 B2
(45) Date of Patent: Jul. 1, 2025

(54) GLASS WINDOW AND DISPLAY DEVICE INCLUDING THE SAME

(71) Applicant: Samsung Display Co., Ltd., Yongin-si (KR)

(72) Inventors: Sunghoon Kim, Asan-si (KR); Seongtaek Lee, Suwon-si (KR); Seungho Kim, Asan-si (KR); Kyung-Man Kim, Anyang-si (KR); Dawoon Kim, Yongin-si (KR); Sanghoon Kim, Hwaseong-si (KR); Yuri Kim, Guri-si (KR); Min-Hoon Choi, Seoul (KR); Seongjin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 137 days.

(21) Appl. No.: 17/825,494

(22) Filed: May 26, 2022

(65) Prior Publication Data

US 2022/0404869 A1 Dec. 22, 2022

(30) Foreign Application Priority Data

Jun. 16, 2021 (KR) ........................ 10-2021-0078344

(51) Int. Cl.
G06F 1/16 (2006.01)
(52) U.S. Cl.
CPC .......... *G06F 1/1616* (2013.01); *G06F 1/1656* (2013.01)
(58) Field of Classification Search
CPC .... G06F 1/1616; G06F 1/1656; G06F 1/1652; G06F 1/1681; G06F 1/1615; G09F 9/301;
(Continued)

(56) References Cited

U.S. PATENT DOCUMENTS 10,020,462 B1 7/2018 Ai et al.
10,303,218 B2 * 5/2019 Jones .................... G06F 1/1626
(Continued)

FOREIGN PATENT DOCUMENTS

KR 10-2018-0079093 7/2018
KR 10-2021-0055845 5/2021
(Continued)

OTHER PUBLICATIONS

Wansun Kim et al., "Controlled multiple neutral planes by low elastic modulus adhesive for flexible organic photovoltaics", Apr. 19, 2017, pp. 1-9, vol. 28, No. 194002.

*Primary Examiner* — Anthony M Haughton
*Assistant Examiner* — Theron S Milliser
(74) *Attorney, Agent, or Firm* — KILE PARK REED & HOUTTEMAN PLLC

(57) ABSTRACT

A glass window includes a first non-folding area, a folding area, and a second non-folding area disposed in a first direction, a first filling layer, a pattern glass disposed below the first filling layer and including an upper surface and a lower surface opposite to the upper surface, and a second filling layer disposed below the pattern glass, the pattern glass includes at least one first pattern part including a groove pattern disposed on an upper surface of the folding area, a first non-pattern part adjacent to the at least one first pattern part of the folding area, at least one second pattern part including a groove pattern disposed on a lower surface of the folding area, and a second non-pattern part adjacent to the at least one second pattern part of the folding area.

29 Claims, 33 Drawing Sheets

(58) Field of Classification Search
CPC ......... C03C 17/00; C03C 17/32; C03C 19/00; B32B 17/10
See application file for complete search history.

(56) References Cited

U.S. PATENT DOCUMENTS

| | | | |
|---|---|---|---|
| 10,314,184 B2 | 6/2019 | Choi et al. | |
| 10,579,105 B2* | 3/2020 | Jones | G09F 9/301 |
| 10,845,848 B2* | 11/2020 | Jones | H05K 1/028 |
| 11,119,539 B2* | 9/2021 | Lee | H05K 1/189 |
| 11,385,682 B2* | 7/2022 | Jones | G09F 9/301 |
| 11,492,289 B2 | 11/2022 | Goo et al. | |
| 11,822,390 B2* | 11/2023 | Jones | G02F 1/133305 |
| 2018/0217639 A1* | 8/2018 | Jones | G06F 1/1618 |
| 2019/0265756 A1* | 8/2019 | Jones | G06F 1/1616 |
| 2020/0150726 A1* | 5/2020 | Jones | G09F 9/301 |
| 2021/0011516 A1* | 1/2021 | Jones | G09F 9/301 |
| 2021/0141418 A1 | 5/2021 | Min | |
| 2021/0282285 A1 | 9/2021 | Sunwoo et al. | |
| 2022/0342450 A1* | 10/2022 | Jones | G06F 1/1641 |
| 2024/0053799 A1* | 2/2024 | Jones | G06F 1/1641 |

FOREIGN PATENT DOCUMENTS

| | | |
|---|---|---|
| KR | 10-2021-0058787 | 5/2021 |
| KR | 10-2021-0059146 | 5/2021 |
| KR | 10-2246919 | 5/2021 |

* cited by examiner

GLASS WINDOW AND DISPLAY DEVICE INCLUDING THE SAME

CROSS-REFERENCE TO RELATED APPLICATIONS

This application claims priority to and benefits of Korean Patent Application No. 10-2021-0078344 under 35 U.S.C. § 119, filed on Jun. 16, 2021 in the Korean Intellectual Property Office, the entire contents of which are incorporated herein by reference.

BACKGROUND

1. Technical Field

The disclosure herein relates to a glass window and a display device including the same, and, to a foldable glass window having impact resistance and a display device including the same.

2. Description of the Related Art

The display device provides information to the user by displaying various images on the display screen. In general, the display device displays information within the assigned screen.

Recently, flexible display devices including a foldable flexible display panel have been developed. Unlike rigid display devices, flexible display devices may be folded, rolled, or bent. The flexible display device, whose shape may be changed in various ways, may be carried regardless of the size of an existing screen, and thus user convenience may be improved.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a foldable glass window having excellent impact resistance and a display device including the same.

An embodiment provides a glass window that may include a first non-folding area, a folding area, and a second non-folding area disposed in a first direction; a first filling layer; a pattern glass disposed below the first filling layer, the pattern glass including an upper surface and a lower surface opposite to the upper surface; and a second filling layer disposed below the pattern glass, wherein the pattern glass may include at least one first pattern part including a groove pattern disposed on an upper surface of the folding area; a first non-pattern part adjacent to the at least one first pattern part of the folding area; at least one second pattern part including a groove pattern disposed on a lower surface of the folding area; and a second non-pattern part adjacent to the at least one second pattern part of the folding area.

In an embodiment, the at least one first pattern part and at least one second pattern part may be spaced apart from each other in a third direction perpendicular to the first direction.

In an embodiment, the at least one first pattern part includes first pattern parts and the at least one second pattern part includes second pattern parts, and the first pattern parts and the second pattern parts may extend in the first direction and may be spaced apart from each other in a second direction perpendicular to the first direction.

In an embodiment, the first pattern parts may include a groove pattern having a same thickness, wherein the second pattern parts may include groove patterns having a same thickness.

In an embodiment, the at least one first pattern part and the at least one second pattern part may include a groove pattern having a same thickness.

In an embodiment, the at least one first pattern part may include a groove pattern having a thickness greater than a thickness of the groove pattern included in the at least one second pattern part.

In an embodiment, the at least one second pattern part may include a groove pattern having a thickness greater than a thickness of the groove pattern included in the at least one first pattern part.

In an embodiment, at least one of the first pattern parts may include a groove pattern having a thickness, wherein at least one of the plurality of second pattern parts may include a groove pattern having a different thickness.

In an embodiment, three consecutive first pattern parts among the first pattern parts may include groove patterns having different thicknesses, and three consecutive second pattern parts among the second pattern parts may include groove patterns having different thicknesses.

In an embodiment, three successive first pattern parts among the first pattern parts may include a groove pattern having a thickness different from a thickness of an adjacent first pattern part, and include a groove pattern having a same thickness as another first pattern part, and three successive second pattern parts among the second pattern parts may include a groove pattern having a thickness different from a thickness of an adjacent second pattern part, and include a groove pattern having a same thickness another second pattern part.

In an embodiment, the at least one first pattern part and the at least one second pattern part may be disposed at a same position in a second direction perpendicular to the first direction, and the first non-pattern part and the second non-pattern part may be disposed at a same position.

In an embodiment, the groove pattern of the at least one first pattern part and the at least one second pattern part may include a bottom surface and a first inner surface and a second inner surface having a shape recessed from the upper surface or the lower surface and defining the groove pattern.

In an embodiment, a thickness of the pattern glass may be in a range of about 100 μm to about 1000 μm.

In an embodiment, the at least one first pattern part and the second non-pattern part may be disposed at a same position in a second direction perpendicular to the first direction, and the at least one second pattern part and the first non-pattern part may be disposed at a same position.

In an embodiment, a sum of the thickness of the groove pattern included in the at least one first pattern part and the thickness of the groove pattern included in the at least one second pattern part may be greater than the thickness of the pattern glass.

In an embodiment, an aspect ratio (a"/b") of the pattern glass may be in a range of about 0.02 to about 0.5, where a" may be an interval between the at least one first pattern part and the at least one second pattern part adjacent to each other, and b" may be an interval from the bottom surface of the groove pattern included in the at least one first pattern part to the bottom surface of the at least one second pattern part.

In an embodiment, an interval c" obtained by subtracting the thickness of the groove pattern included in the at least one second pattern part from the thickness of the pattern glass may be greater than an interval c1" obtained by subtracting the thickness of the groove pattern included in the at least one first pattern part from the thickness of the pattern glass.

In an embodiment, the interval c" may be in a range of about 10 μm to about 300 μm, wherein the interval c1" may be in a range of about 5 μm to about 300 μm.

In an embodiment, the glass window may further include a chamfered surface cut at a first angle θ in a corner area formed by the first inner surface and the upper surface or lower surface of the pattern glass, wherein the first angle θ may be in a range of about 5 degrees to about 85 degrees.

In an embodiment, a first length and a second length forming a right triangle with the chamfered surface may be in a range of about 5 μm to about 45 respectively.

In an embodiment, at least one first pattern line may be disposed on the upper surface of the pattern glass corresponding to the folding area and dividing a groove pattern included in the at least one first pattern part; and at least one second pattern line disposed on the lower surface of the pattern glass corresponding to the folding area and dividing a groove pattern included in the at least one second pattern part.

In an embodiment, the at least one first pattern line may include first pattern lines, the at least one second pattern line may include second pattern lines, and the first pattern lines and the second pattern lines may be disposed only in a part of the folding area in a second direction perpendicular to the first direction.

In an embodiment, the at least one first pattern line may include first pattern lines, the at least one second pattern line may include second pattern lines, and the first pattern lines and second pattern lines may be disposed in all of the folding area in a second direction perpendicular to the first direction.

In an embodiment, a display device may include a first non-folding area, a folding area, and a second non-folding area disposed in a first direction; a display module that displays an image; and a glass window disposed on the display module, the glass window including a pattern glass having an upper surface and a lower surface facing the upper surface, wherein the pattern glass may include at least one first pattern part including a groove pattern disposed on an upper surface of the folding area; a first non-pattern part adjacent to the at least one first pattern part of the folding area; at least one second pattern part including a groove pattern disposed on a lower surface of the folding area; and a second non-pattern part adjacent to the at least one second pattern part of the folding area.

In an embodiment, the glass window may further include a filling layer disposed on the upper surface and the lower surface of the pattern glass, respectively, and the filling layer may fill the groove pattern of the first pattern part and the second pattern part.

In an embodiment, the glass window may further include a protective layer disposed on the upper surface of the pattern glass.

In an embodiment, the at least one first pattern part includes first pattern parts, the at least one second pattern part may include second pattern parts, and the first pattern parts and second pattern parts may extend in the first direction and may be spaced apart from each other in a second direction perpendicular to the first direction.

In an embodiment, in a display device including a first non-folding area, a folding area, and a second non-folding area disposed in a first direction, provided is a display device including a display module for displaying an image and a glass window according to an embodiment disposed on the display module.

The glass window may further include a filling layer disposed on an upper surface and a lower surface of the pattern glass, respectively, and the filling layer may fill the groove pattern.

The glass window may further include a protective layer disposed on the upper surface of the pattern glass.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1:
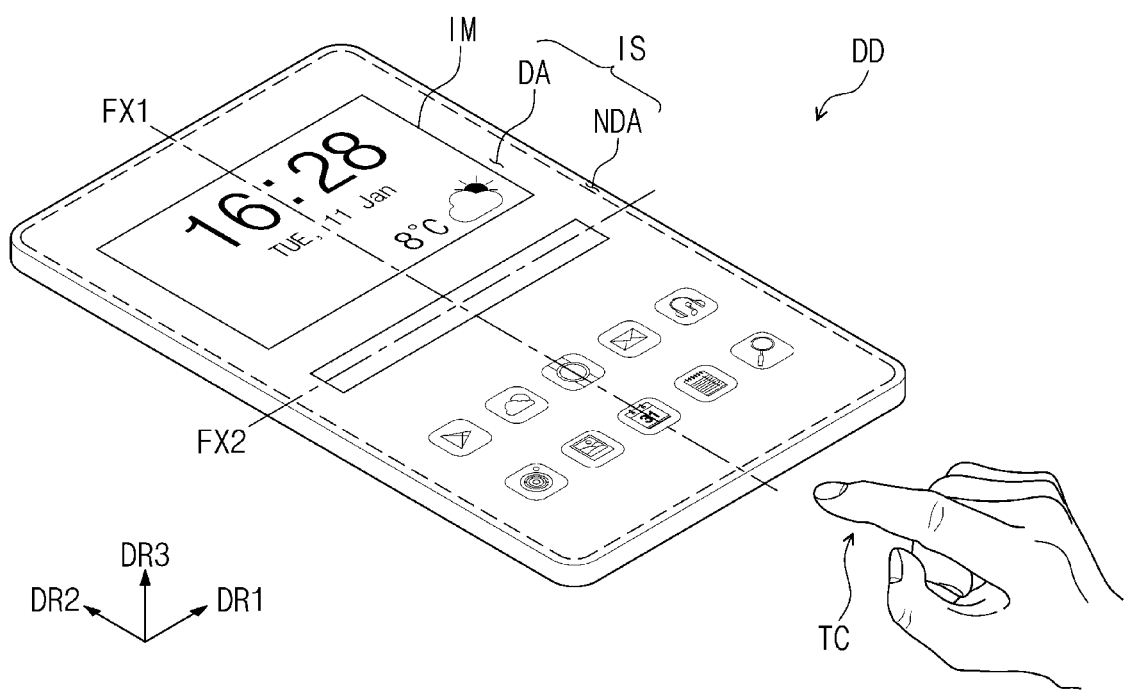
FIG. 1 is a schematic perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In this specification, when an element (or region, layer, part, etc.) is referred to as being "on", "connected to", or "coupled to" another element, it means that it may be directly placed on/connected to/coupled to other components, or a third component may be arranged between them.

Like reference numerals refer to like elements. Additionally, in the drawings, the thicknesses, proportions, and dimensions of components are exaggerated for effective description. "And/or" includes all of one or more combinations defined by related components.

For example, in the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that the terms "first" and "second" are used herein to describe various components but these components should not be limited by these terms. The above terms are used only to distinguish one component from another. For example, a first component may be referred to as a second component and vice versa without departing from the scope of the disclosure. The terms of a singular form may include plural forms unless otherwise specified. For example, as used herein, the singular forms, "a," "an," and "the" are intended to include the plural forms as well, unless the context clearly indicates otherwise.

In addition, terms such as "below", "the lower side", "on", and "the upper side" are used to describe a relationship of components shown in the drawing. The terms are described as a relative concept based on a direction shown in the drawing, however, the terms are not limited thereto.

For example, the spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

In various embodiments of the disclosure, the terms "include," "comprise," "including," or "comprising," or "have" and "having" and variations thereof specify a property, a region, a fixed number, a step, a process, an element and/or a component but do not exclude other properties, regions, fixed numbers, steps, processes, elements and/or components.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure pertains. In addition, terms such as terms defined in commonly used dictionaries should be interpreted as having a meaning consistent with the meaning in the context of the related technology, and it should not be construed in an overly ideal or overly formal sense unless explicitly defined here.

Hereinafter, embodiments will be described with reference to the drawings.

FIG. 1 is a schematic perspective view of a display device according to an embodiment.

Referring to FIG. 1, the display device DD may be a device that is activated according to an electrical signal. The display device DD may include various embodiments. For example, the display device DD may be used for small and medium-sized electronic devices such as personal computers, notebook computers, personal digital terminals, car navigation units, game machines, portable electronic devices, and cameras in addition to large electronic devices such as televisions, monitors, or external billboards. In this embodiment, a case where the display device DD is a smart phone is illustrated, by way of example.

The display device DD has a rectangular shape having a short side in a first direction DR1 and a long side in a second direction DR2 crossing or intersecting the first direction DR1. However, the shape of the display device DD is not limited thereto, and various shapes of the display device DD may be provided. It is to be understood that the shapes disclosed herein may include shapes substantially identical or similar to the shapes.

The display device DD may be a foldable electronic device. For example, the display device DD according to an embodiment may be folded based on a folding axis extending in a direction. Hereinafter, a flat state that is not folded is defined as a first state (for example, a non-folding state), and a state that is folded based on the folding axis is defined as a second state (for example, a folding state). The folding axis may be a rotation axis generated in case that the display device DD is folded, and may be formed by a mechanical structure of the display device DD.

The folding axis may extend in the first direction DR1 or the second direction DR2. In an embodiment, a folding axis extending in the second direction DR2 is defined as a first folding axis FX1, and a folding axis extending in the first direction DR1 is defined as a second folding axis FX2 (see FIG. 2C). The display device DD may include one of the first and second folding axes FX1 and FX2. For example, the display device DD may be folded based on one of the first and second folding axes FX1 and FX2.

As shown in FIG. 1, the display device DD may display the image IM on the display surface IS parallel to each of the first direction DR1 and the second direction DR2. The display surface IS on which the image IM is displayed may correspond to the front surface of the display device DD. A direction perpendicular to the display surface IS, for example, a thickness direction of the display device DD, may be referred to as a third direction DR3. The display device DD may display the image IM toward the third direction DR3.

The display surface IS of the display device DD may be divided into areas. A display area DA and a non-display area NDA may be defined on the display surface IS of the display device DD.

The display area DA may be an area in which the image IM is displayed, and the user recognizes the image IM through the display area DA. The display area DA may have a rectangular shape. The non-display area NDA may be an area adjacent to the display area DA, and may be an area in which the image IM is not displayed. A bezel area of the display device DD may be defined by the non-display area NDA. As an example of the disclosure, the non-display area NDA may surround the display area DA. Accordingly, the shape of the display area DA may be substantially defined by the non-display area NDA. However, this is shown as an example, and the non-display area NDA may be disposed adjacent to only one side or a side of the display area DA, and the non-display area NDA may be omitted.

The display device DD according to the disclosure may detect the user's input TC applied from the outside. The user's input TC may include various types of external inputs such as part of the user's body, light, heat, or pressure. In this embodiment, the user's input TC is shown as the user's hand applied to the front surface. However, this is shown as an example, as described above, the user's input TC may be provided in various forms, and, the display device DD may detect the user input TC applied to the side or rear surface of the display device DD according to the structure of the display device DD, and the disclosure is not limited thereto.

The display device DD may activate the display surface IS to display the image IM and simultaneously detect the user's input TC. In this embodiment, the area for detecting the user's input TC is illustrated as being provided in the display area DA where the image IM is displayed. However, this is illustrated by way of example, and the area for detecting the user's input TC may be provided in the non-display area NDA or all areas of the display surface IS.

FIGS. 2A to 2D are views illustrating a state in which the display device shown in FIG. 1 is folded.

Figure 2A:
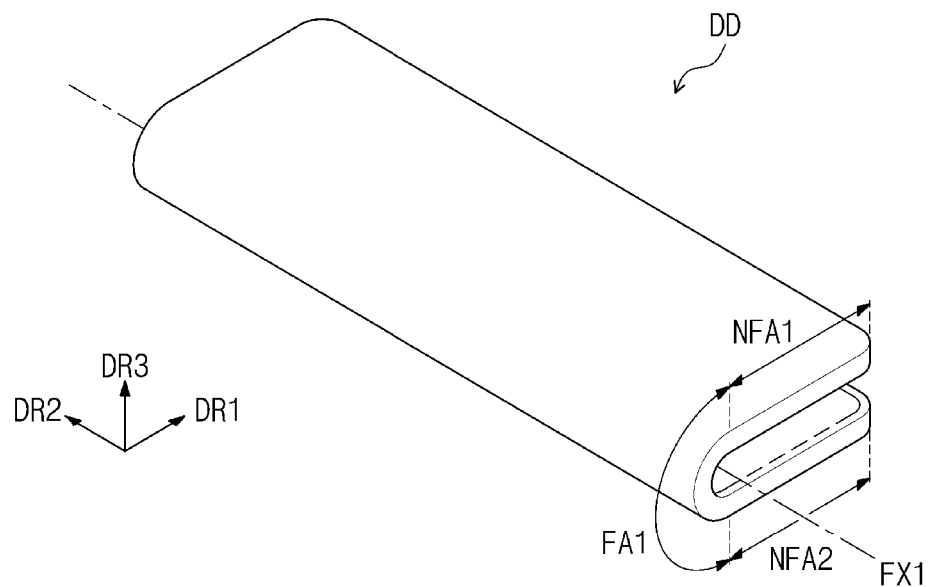
FIGS. 2A to 2D are views illustrating a state in which the display device shown in FIG. 1 is folded.
Figure 2B:
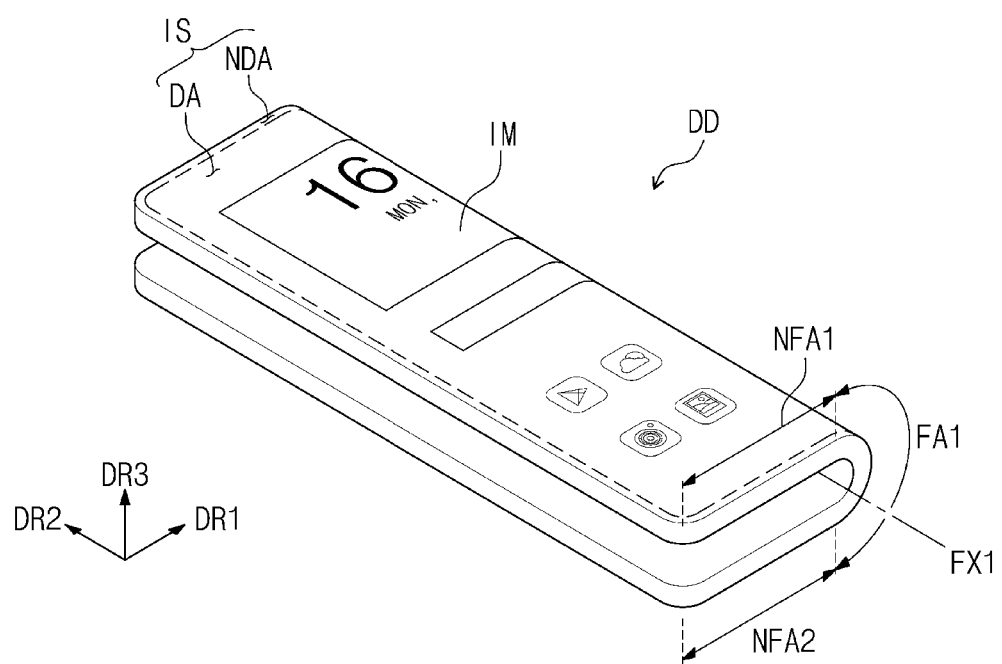

FIG. 2A is a schematic diagram showing a state in which the display device DD shown in FIG. 1 is in-folded along the first folding axis FX1, and FIG. 2B is a schematic diagram illustrating a state in which the display device DD shown in FIG. 1 is out-folded along the first folding axis FX1.

Figure 2C:
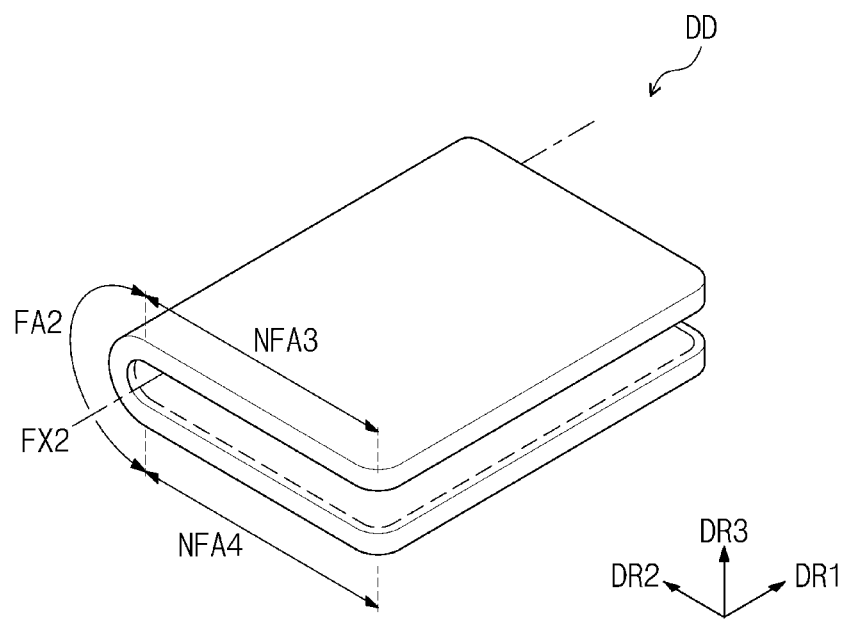
Figure 2D:
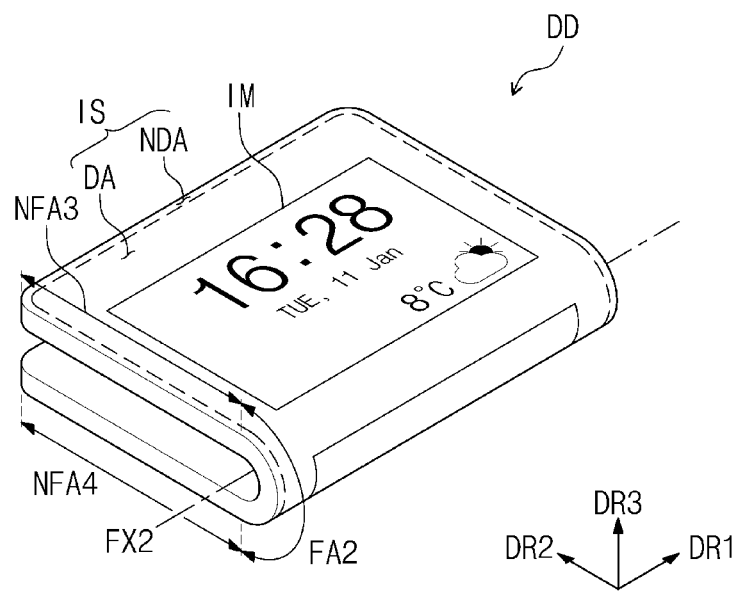

FIG. 2C is a schematic diagram showing a state in which the display device DD shown in FIG. 1 is in-folded along the second folding axis FX2, and FIG. 2D is a schematic diagram illustrating a state in which the display device DD shown in FIG. 1 is out-folded along the second folding axis FX2.

Referring to FIGS. 2A to 2D, the display device DD may be a foldable display device. It may be folded based on a folding axis extending in a direction (for example, the first folding axis FX1 or the second folding axis FX2).

Referring to FIGS. 2A to 2B, areas may be defined in the display device DD according to an operation type. The areas may be divided into a folding area FA1 and at least one non-folding area NFA1 or NFA2. A folding area FA1 is defined between two non-folding areas NFA1 and NFA2.

The folding area FA1 may be an area that is folded based on the first folding axis FX1 and substantially forms a curvature. Here, the first folding axis FX1 may extend in the second direction DR2, for example, the long axis direction of the display device DD. The folding area FA1 is defined as an area that is folded along the first folding axis FX1 and extends in the second direction DR2.

As an example of the disclosure, the non-folding areas NFA1 and NFA2 may include a first non-folding area NFA1 and a second non-folding area NFA2. The first non-folding area NFA1 may be adjacent to one side or a side of the folding area FA1 in the first direction DR1, and the second non-folding area NFA2 may be adjacent to the other side of the folding area FA1 in the first direction DR1.

The display device DD may be in-folding or out-folding. Folding the display surfaces of different non-folding areas NFA1 and NFA2 to face each other is defined as in-folding, and folding the display surfaces of the different non-folding areas NFA1 and NFA2 to face the outside is defined as out-folding.

Here, in-folding refers to folding of the display surfaces IS to face each other, and out-folding refers to folding in which the rear surfaces of the display device DD face each other.

The display device DD shown in FIG. 2A may be in-folded so that the display surface IS of the first non-folding area NFA1 and the display surface IS of the second non-folding area NFA2 face each other. As the first non-folding area NFA1 is rotated clockwise along the first folding axis FX1, the display device DD may be in-folded. In order to in-fold the display device DD so that the first non-folding area NFA1 and the second non-folding area NFA2 are aligned, the first folding axis FX1 may be defined at the center of the display device DD in the first direction DR1.

Referring to FIG. 2B, the display device DD may be out-folded based on the first folding axis FX1. The display device DD may display the image IM in case that the display surface of the first non-folding area NFA1 and the display surface of the second non-folding area NFA2 are exposed to the outside. The display surface of the folding area FA1 exposed to the outside may also display the image IM. As shown in FIG. 1, the display device DD may display the image IM in an unfolded state. The first non-folding area NFA1, the second non-folding area NFA2, and the folding area FA1 may each display images that provide information independent of each other, or display portions of one image that provide one piece of information.

The display device DD may be manufactured to have both an in-folding state and an out-folding state, or may be manufactured to have any one of an in-folding state and an out-folding state.

Referring to FIGS. 2C and 2D, the display device DD may be in-folded or out-folded based on the second folding axis FX2. The second folding axis FX2 may extend along the first direction DR1, for example, the short axis direction of the display device DD.

Areas may be defined in the display device DD according to an operation type. The areas may be divided into a folding area FA2 and at least one non-folding area NFA3 or NFA4. A folding area FA2 is defined between two non-folding areas NFA3 and NFA4.

The folding area FA2 may be an area that is folded based on the second folding axis FX2 and substantially forms a curvature. The folding area FA2 is defined as an area that is folded along the second folding axis FX2 and extends in the first direction DR1.

As an example of the disclosure, the non-folding areas NFA3 and NFA4 may include a first non-folding area NFA3 and a second non-folding area NFA4. The first non-folding area NFA3 may be adjacent to one side or a side of the folding area FA2 in the second direction DR2, and the second non-folding area NFA4 may be adjacent to the other side of the folding area FA2 in the second direction DR2.

Figure 3A:
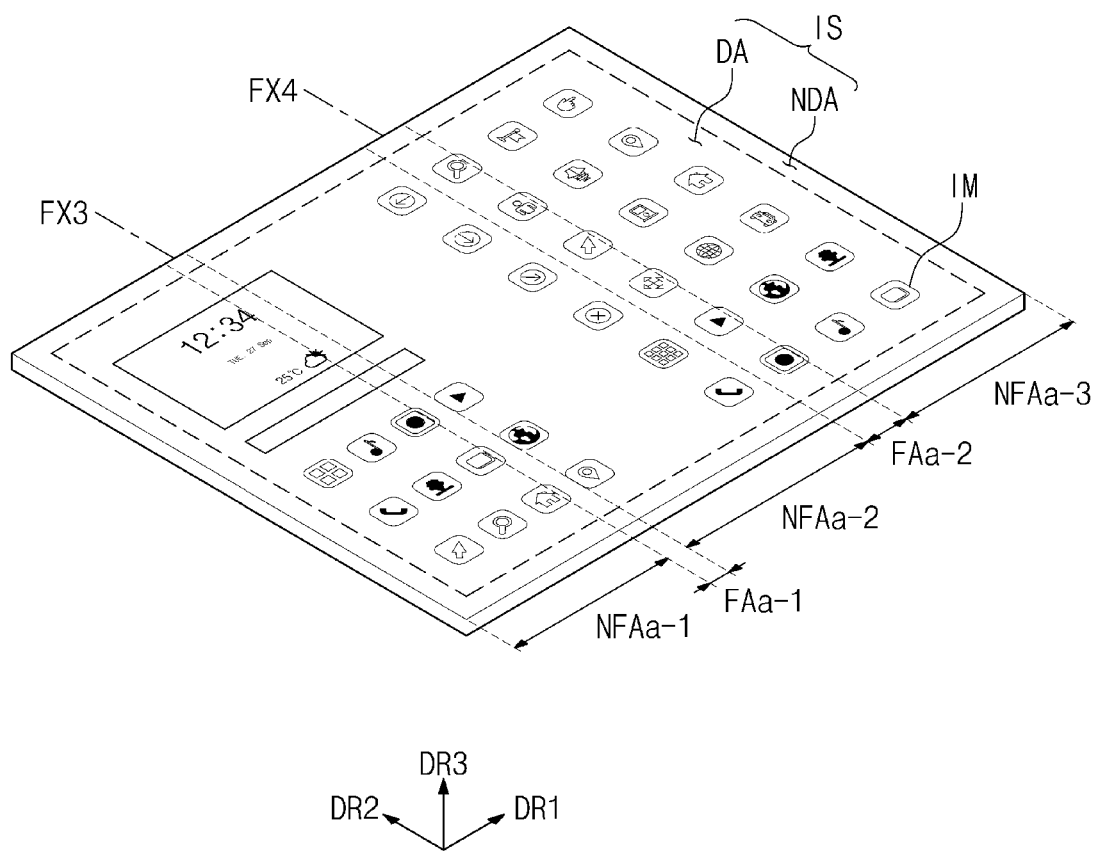
FIG. 3A is a schematic perspective view of a display device in an unfolded state according to an embodiment.
Figure 3B:
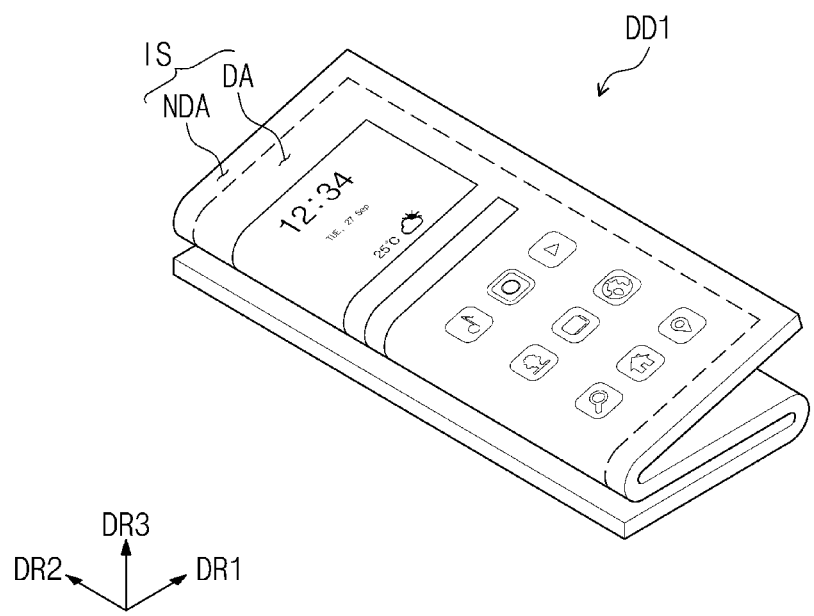
FIGS. 3B and 3C are views illustrating a state in which the display device shown in FIG. 3A is folded.
Figure 3C:
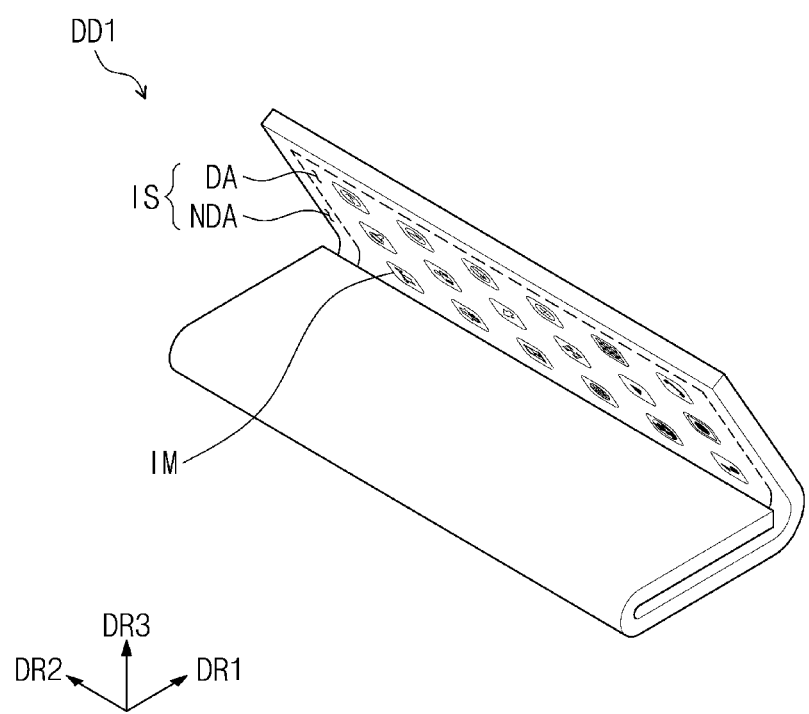

FIG. 3A is a schematic perspective view of a display device in an unfolded state according to an embodiment. FIGS. 3B and 3C are schematic diagrams illustrating a state in which the display device shown in FIG. 3A is multi-folded.

Referring to FIGS. 3A to 3C, in an embodiment, the display device DD1 may be a multi-foldable electronic device. The display device DD1 may have folding areas defined. The display device DD1 may include folding areas FAa-1 and FAa-2 and non-folding areas NFAa-1, NFAa-2, and NFAa-3. As shown in FIGS. 3A to 3C, the display device DD1 including a first folding area FAa-1, a second folding area FAa-2, a first non-folding area NFAa-1, a second non-folding area NFAa-2, and a third non-folding area NFAa-3 is illustrated as an example. In the first direction DR1, the first folding area FAa-1 is disposed between the first non-folding area NFAa-1 and the second non-folding area NFAa-2, and the second folding area FAa-2 is disposed between the second non-folding area NFAa-2 and the third non-folding area NFAa-3. By way of example, two folding areas FAa-1 and FAa-2 and three non-folding areas NFAa-1, NFAa-2, and NFAa-3 are shown, but the number of the folding areas FAa-1 and FAa-2 and the non-folding areas NFAa-1, NFAa-2, and NFAa-3 is not limited thereto and may further increase.

Referring to FIGS. 3A and 3B, the first folding area FAa-1 may be folded based on the third folding axis FX3 parallel to the second direction DR2. The display surface of the first non-folding area NFAa-1 may be disposed outside, and may be outer-folded so that the display surface of the second non-folding area NFAa-2 may be away from the display surface of the first non-folding area NFAa-1. The second folding area FAa-2 may be folded based on the fourth folding axis FX4 parallel to the second direction DR2. The inner-folding may be performed so that the display surface of the second non-folding area NFAa-2 and the display surface of the third non-folding area NFAa-3 approach and face each other.

Referring to FIGS. 3A and 3C, the first folding area FAa-1 may be folded based on the third folding axis FX3 parallel to the second direction DR2. The display surface of the first non-folding area NFAa-1 may be disposed inside, and may be inner-folded so that the display surface of the second non-folding area NFAa-2 approaches and faces the display surface of the first non-folding area NFAa-1. The second folding area FAa-2 may be folded based on the fourth folding axis FX4 parallel to the second direction DR2. The inner-folding may be performed so that the display surface of the second non-folding area NFAa-2 and the display surface of the third non-folding area NFAa-3 approach and face each other.

In one embodiment, an outer-folding operation and an inner-folding operation may occur at the same time, or only one of an outer-folding operation and an inner-folding operation may occur.

Although the multi-folded state of the display device DD1 is illustrated in FIGS. 3B and 3C, the disclosure is not limited thereto and may have various folding shapes.

Figure 4:
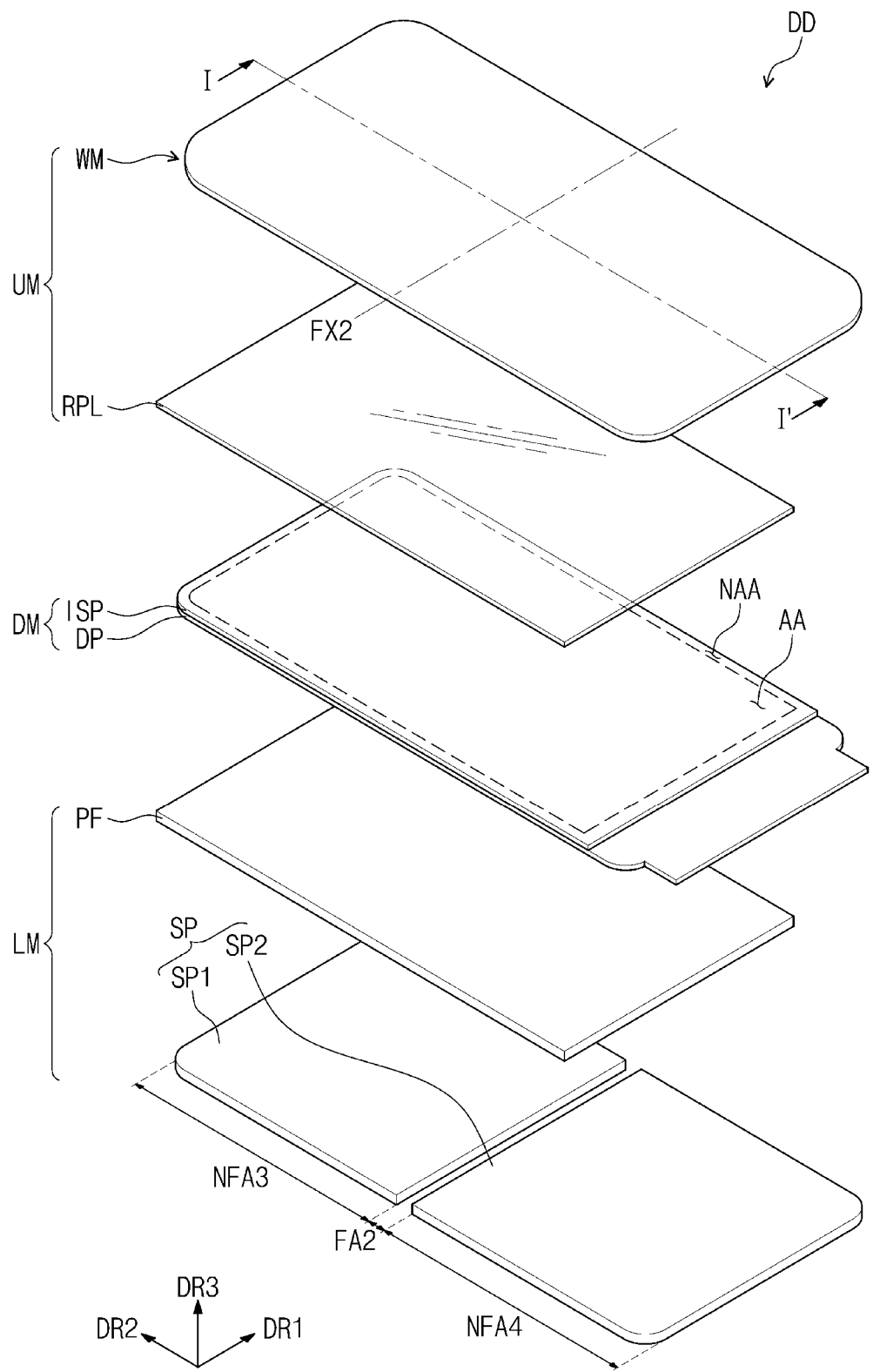
FIG. 4 is an exploded schematic perspective view of a display device according to an embodiment.
Figure 5A:
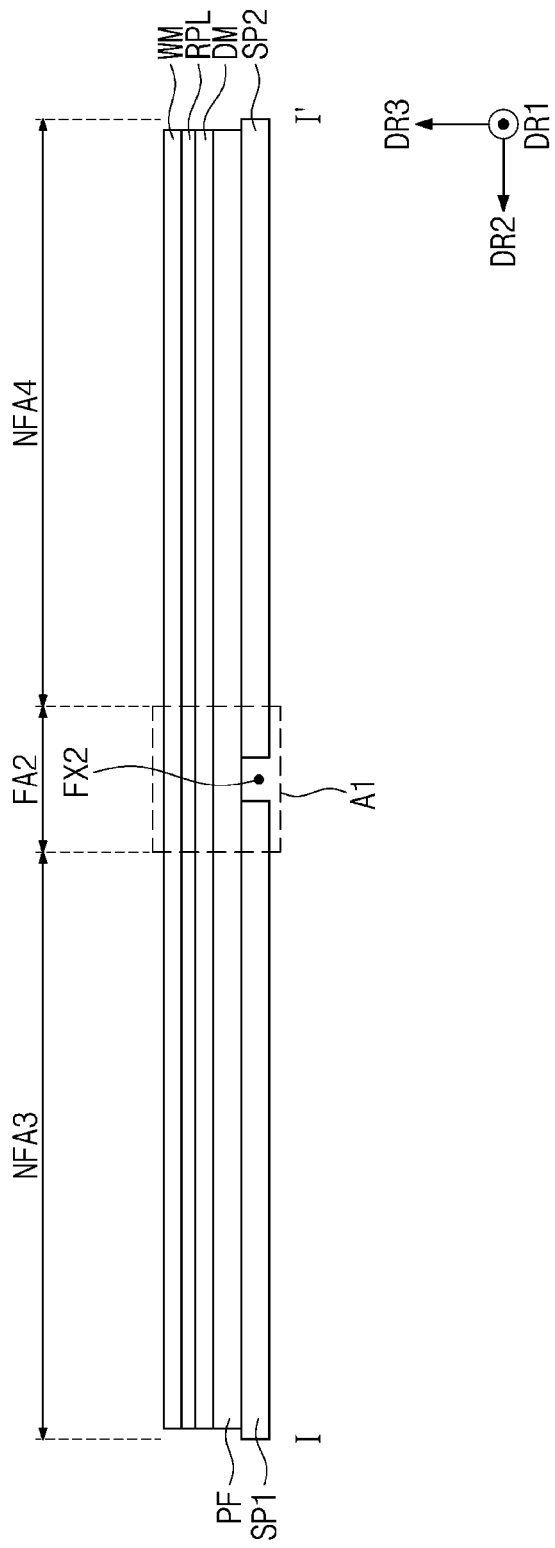
FIG. 5A is a schematic cross-sectional view taken along the cutting line I-I' shown in FIG. 4.
Figure 5B:
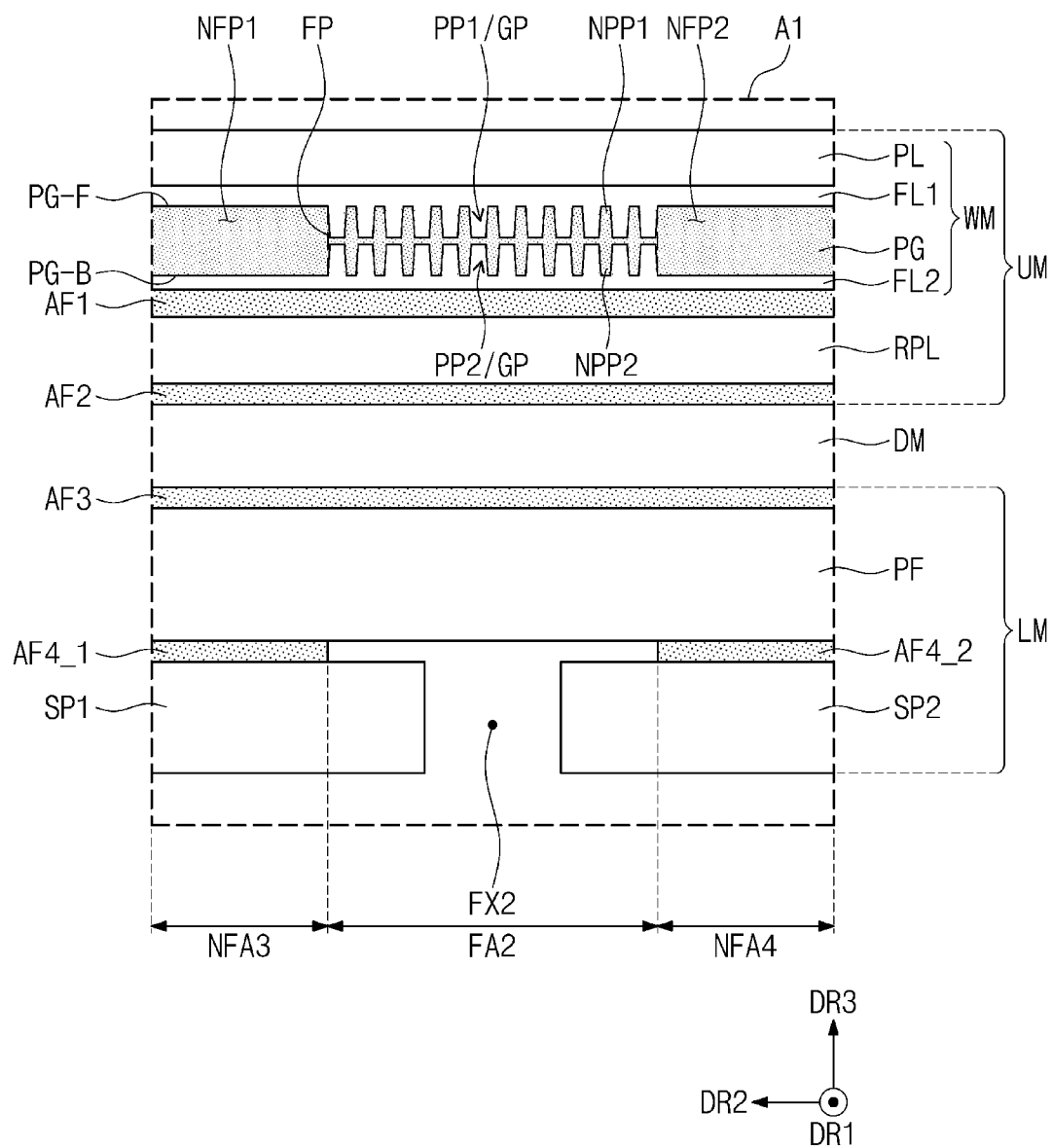
FIG. 5B is an enlarged schematic cross-sectional view of portion A1 shown in FIG. 5A.

FIG. 4 is an exploded schematic perspective view of a display device according to an embodiment, and FIG. 5A is a schematic cross-sectional view taken along the cutting line I-I' shown in FIG. 4. FIG. 5B is an enlarged schematic cross-sectional view of portion A1 shown in FIG. 5A.

Referring to FIGS. 4 to 5B, a display device DD according to an embodiment may include a display module DM for displaying an image, an upper module UM disposed on the display module DM, and a lower module LM disposed below the display module DM. The display module DM constitutes a part of the display device DD, and by way of example, an image may be generated by the display module DM.

The display module DM may include a display panel DP and an input detector or detection unit ISP. The display panel DP according to an embodiment may be a light emitting display panel, and is not particularly limited. For example, the display panel DP may be an organic light emitting display panel, an inorganic light emitting display panel, or a quantum dot light emitting display panel. The light emitting layer of the organic light emitting display panel may include an organic light emitting material, and the light emitting layer of the inorganic light emitting display panel may include an inorganic light emitting material. The light emitting layer of the quantum dot light emitting display panel may include quantum dot, quantum rod, and the like within the spirit and the scope of the disclosure. Hereinafter, the display panel DP is described as the organic light emitting display panel.

The display panel DP may be a flexible display panel. Accordingly, the display panel DP may be completely rolled or folded or unfolded about the folding axis FX2.

The input detection unit ISP may be disposed on or directly disposed on the display panel DP. According to an embodiment, the input detection unit ISP may be formed on the display panel DP by a continuous process. For example, in case that the input detection unit ISP is disposed on or disposed directly on the display panel DP, the adhesive film is not disposed between the input detection unit ISP and the display panel DP. However, the disclosure is not limited thereto. An adhesive film may be disposed between the input detection unit ISP and the display panel DP. The input detection unit ISP is not manufactured by a continuous process with the display panel DP, and after manufactured through a process separate from that of the display panel DP, the input detection unit ISP may be fixed to the upper surface of the display panel DP by an adhesive film.

The display panel DP generates an image, and the input detection unit ISP acquires coordinate information for a user's input (for example, a touch event).

The upper module UM may include a glass window WM disposed on the display module DM. The glass window WM may include an optically transparent insulating material. Accordingly, the image generated by the display module DM may be readily recognized by the user through the glass window WM. The glass window WM may include a pattern glass PG and filling layers FL1 and FL2.

The pattern glass PG may include a glass material. The pattern glass PG may include a folding part FP and non-folding parts NFP1 and NFP2. The folding part FP may be a part corresponding to the folding area FA2, and the non-folding parts NFP1 and NFP2 may be parts corresponding to the first and second non-folding areas NFA3 and NFA4. The non-folding parts NFP1 and NFP2 may include a first non-folding part NFP1 corresponding to the first non-folding area NFA3 and a second non-folding part NFP2 corresponding to the second non-folding area NFA4. The folding part FP may be disposed between the first and second non-folding parts NFP1 and NFP2.

The pattern glass PG may include an upper surface PG-F and a lower surface PG-B. The upper surface PG-F and the lower surface PG-B refer to two surfaces facing each other in the pattern glass PG, and may be, for example, two surfaces facing each other in the first direction DR1. However, the disclosure is not limited thereto, and may be two surfaces facing each other in the second direction DR2 or two surfaces facing each other in the third direction DR3. In FIG. 5B, two surfaces facing each other in the third direction DR3 may be referred to as an upper surface PG-F and a lower surface PG-B.

The folding part FP may include pattern parts PP1 and PP2 and non-pattern parts NPP1 and NPP2.

In an embodiment, the folding part FP may include a first pattern part PP1 provided on the upper surface PG-F and a first non-pattern part NPP1 adjacent to the first pattern part PP1. The folding part FP may include first pattern parts PP1 and first non-pattern parts NPP1, respectively. A first non-pattern part NPP1 may be provided between two first pattern parts PP1 adjacent to each other among the first pattern parts PP1. For example, the first pattern part PP1 may be provided between two first non-pattern parts NPP1 adjacent to each other among the first non-pattern parts NPP1. As an example of the disclosure, in case that the folding axis FX2 extends in the first direction DR1, the first pattern part PP1 may be arranged (or disposed) to be spaced apart from each other in the second direction DR2 orthogonal to the first direction DR1.

The folding part FP may include a second pattern part PP2 provided on the lower surface PG-B and a second non-pattern part NPP2 adjacent to the second pattern part PP2. The folding part FP may include second pattern parts PP2 and second non-pattern parts NPP2, respectively. A second non-pattern part NPP2 may be provided between two second pattern parts PP2 adjacent to each other among the second pattern parts PP2. For example, the second pattern part PP2 may be provided between two second non-pattern parts NPP2 adjacent to each other among the second non-pattern parts NPP2. As an example of the disclosure, in case that the folding axis FX2 extends in the first direction DR1, the second pattern part PP2 may be arranged to be spaced apart from each other in the second direction DR2 orthogonal to the first direction DR1.

In an embodiment, the first pattern part PP1 and the second pattern part PP2 may be arranged to be spaced apart from each other in the third direction DR3 orthogonal to the first direction DR1 and the second direction DR2.

Each of the pattern parts PP1 and PP2 may include at least one groove pattern GP (refer to FIG. 7A) recessed from one surface or a surface (for example, upper or lower surface) of the pattern glass PG. The groove pattern GP will be described in detail later with reference to the drawings.

The filling layers FL1 and FL2 may include a synthetic resin material. The filling layers FL1 and FL2 may include a material having the same refractive index as that of the pattern glass PG. As an example of the disclosure, the filling layers FL1 and FL2 may include at least one selected from a urethane-based resin, an epoxy-based resin, a polyester-based resin, a polyether-based resin, an acrylate-based resin, an acrylonitrile-butadiene-styrene (ABS) resin, and rubber. For example, the filling layers FL1 and FL2 may include at least one of phenylene, polyethyleneterephthalate (PET), polyimide (PI), polyamide (PAI), polyethylene naphthalate (PEN), and polycarbonate (PC).

A first filling layer FL1 and/or a second filling layer FL2 may be disposed on the upper and/or lower surfaces of the pattern glass PG. The filling layers FL1 and FL2 may provide a flat surface to the pattern glass PG. The filling layers FL1 and FL2 may be a cover layer that completely covers or overlaps the folding part FP and the non-folding parts NFP1 and NFP2 of the pattern glass PG.

In an embodiment, the groove pattern GP provided to the folding part FP of the pattern glass PG may be filled by the filling layers FL1 and FL2. The first filling layer FL1 may fill the first pattern part PP1. The second filling layer FL2 may fill the second pattern part PP2. In other words, the recessed portion of the first pattern part PP1 may be filled by the first filling layer FL1, and the recessed portion of the second pattern part PP2 may be filled by the second filling layer FL2. Accordingly, the glass window WM may have a flat surface due to the filling layers FL1 and FL2. The filling layers FL1 and FL2 may be disposed on the non-pattern parts NPP1 and NPP2 and the first and second non-folding parts NFP1 and NFP2 of the pattern glass PG while filling the groove pattern GP. However, the disclosure is not limited thereto, and for example, the filling layers FL1 and FL2 may be provided only for the folding part FP to fill the groove pattern GP.

The glass window WM may further include a protective layer PL. The protective layer PL may be provided on the pattern glass PG. The protective layer PL may be provided on the first filling layer FL1. The protective layer PL may perform a function of protecting the pattern glass PG from external impact. The protective layer PL may include a synthetic resin material. As an example of the disclosure, the protective layer PL may include at least one selected from a urethane-based resin, an epoxy-based resin, a polyester-based resin, a polyether-based resin, an acrylate-based resin, an acrylonitrile-butadiene-styrene (ABS) resin, and rubber. For example, the protective layer PL may include at least one of phenylene, polyethyleneterephthalate (PET), polyimide (PI), polyamide (PAI), polyethylene naphthalate (PEN), and polycarbonate (PC).

The glass window WM may be folded or unfolded about the folding axis FX2. For example, the shape of the glass window WM may be deformed together in case that the display module DM is deformed. The glass window WM prevents the display module DM from being damaged or malfunctioning due to an external impact by transmitting the image from the display module DM and at the same time alleviating external shock. An external shock is a force from the outside that may be expressed as pressure or stress, and means a force that causes a defect in the display module DM.

Also, the upper module UM may further include one or more functional layers disposed between the display module DM and the glass window WM. As an example of the disclosure, the functional layer may be an anti-reflection layer RPL that blocks reflection of external light. The anti-reflection layer RPL may prevent a problem that elements constituting the display module DM are viewed from the outside by external light incident through the front surface of the display device DD. The anti-reflection layer RPL may include a retarder and a polarizer. The retarder may be a film type or a liquid crystal coating type, and may include a $\lambda/2$ retarder and/or a $\lambda/4$ retarder. The polarizer may also be a film type or liquid crystal coating type. The film type may include a stretchable synthetic resin film, and the liquid crystal coating type may include liquid crystals arranged in an arrangement. The retarder and the polarizer may be implemented as one polarizing film. The functional layer may further include a protective film disposed on or below the anti-reflection layer RPL.

The upper module UM may further include a first adhesive film AF1 provided between the anti-reflection layer RPL and the glass window WM, and a second adhesive film AF2 provided between the anti-reflection layer RPL and the display module DM. Each of the first and second adhesive films AF1 and AF2 may include an optically transparent adhesive material. As an example of the disclosure, the first and second adhesive films AF1 and AF2 may include a pressure sensitive adhesive (PSA), an optical clear adhesive (OCA), or an optical clear resin (OCR).

The display module DM may display an image according to an electrical signal and transmit or receive information about an external input. The display module DM may be defined as an active area AA and a peripheral area NAA. The active area AA may be defined as an area emitting an image provided from the display module DM.

The peripheral area NAA may be adjacent to the active area AA. For example, the peripheral area NAA may surround the active area AA. However, this is illustrated by way of example, and the peripheral area NAA may be defined in various shapes, and is not limited to any one embodiment. According to an embodiment, the active area AA of the display module DM may correspond to at least a part of the display area DA.

The lower module LM may include a support plate SP disposed on the rear surface of the display module DM to support the display module DM. The support plate SP may include the number of support plates corresponding to the non-folding areas NFA3 and NFA4. As an example of the disclosure, the support plate SP may include a first support plate SP1 and a second support plate SP2 spaced apart from the first support plate SP1.

The first and second support plates SP1 and SP2 may be disposed to correspond to the first and second non-folding areas NFA3 and NFA4, respectively. The first support plate SP1 is disposed to correspond to the first non-folding area NFA3 of the display module DM, and the second support plate SP2 is disposed to correspond to the second non-folding area NFA4 of the display module DM. Each of the first and second support plates SP1 and SP2 may include a metal material or a plastic material.

In case that the display module DM has a flat first state, the first and second support plates SP1 and SP2 are disposed to be spaced apart from each other in the second direction DR2. In case that the display module DM has a second state in which it is folded based on the folding axis FX2, the first and second support plates SP1 and SP2 may be disposed to be spaced apart from each other in the third direction DR3.

The first and second support plates SP1 and SP2 may be spaced apart from each other to correspond to the folding area FA2. The first and second support plates SP1 and SP2 may partially overlap the folding area FA2. For example, the separation distance between the first and second support plates SP1 and SP2 in the second direction DR2 may be smaller than the width of the folding area FA2.

The support plate SP may further include a connection module for connecting the first and second support plates SP1 and SP2. The connection module may include a hinge module or a multi-joint module.

Although the case in which the support plate SP may include two support plates SP1 and SP2 is illustrated, the disclosure is not limited thereto. For example, in case that the folding shafts FX2 are provided, the support plate SP may include support plates separated based on the folding shafts FX2. The support plate SP may be provided in an integral shape without being separated into the first and second support plates SP1 and SP2. A bending part may be provided on the support plate SP to correspond to the folding area FA2. The bending part may be provided with an opening formed through the support plate SP or a groove recessed from one surface or a surface of the support plate SP.

The lower module LM further may include a protective film PF disposed between the display module DM and the support plate SP. The protective film PF may be a layer disposed under or below the display module DM to protect the rear surface of the display module DM. The protective film PF may include a synthetic resin film, for example, a polyimide film or a polyethylene terephthalate film. However, this is an example, and the protective film PF is not limited thereto.

The lower module LM may further include a third adhesive film AF3 disposed between the protective film PF and the display module DM, and a fourth adhesive film disposed between the protective film PF and the support plate SP. The protective film PF may be attached to the rear surface of the display module DM by the third adhesive film AF3. As an example of the disclosure, the fourth adhesive film may include a first sub-adhesive film AF4_1 and a second sub-adhesive film AF4_2. The first sub-adhesive film AF4_1 is disposed between the first support plate SP1 and the protective film PF, and the second sub-adhesive film AF4_2 is disposed between the second support plate SP2 and the protective film PF. The first and second sub-adhesive films AF4_1 and AF4_2 may be spaced apart from each other with the folding area FA2 therebetween.

Each of the third and fourth adhesive films AF3, AF4_1, and AF4_2 may include an optically transparent adhesive material. As an example of the disclosure, the third and fourth adhesive films AF3, AF4_1, and AF4_2 may include a pressure sensitive adhesive (PSA), an optical clear adhesive (OCA), or an optical clear resin (OCR).

Figure 6:
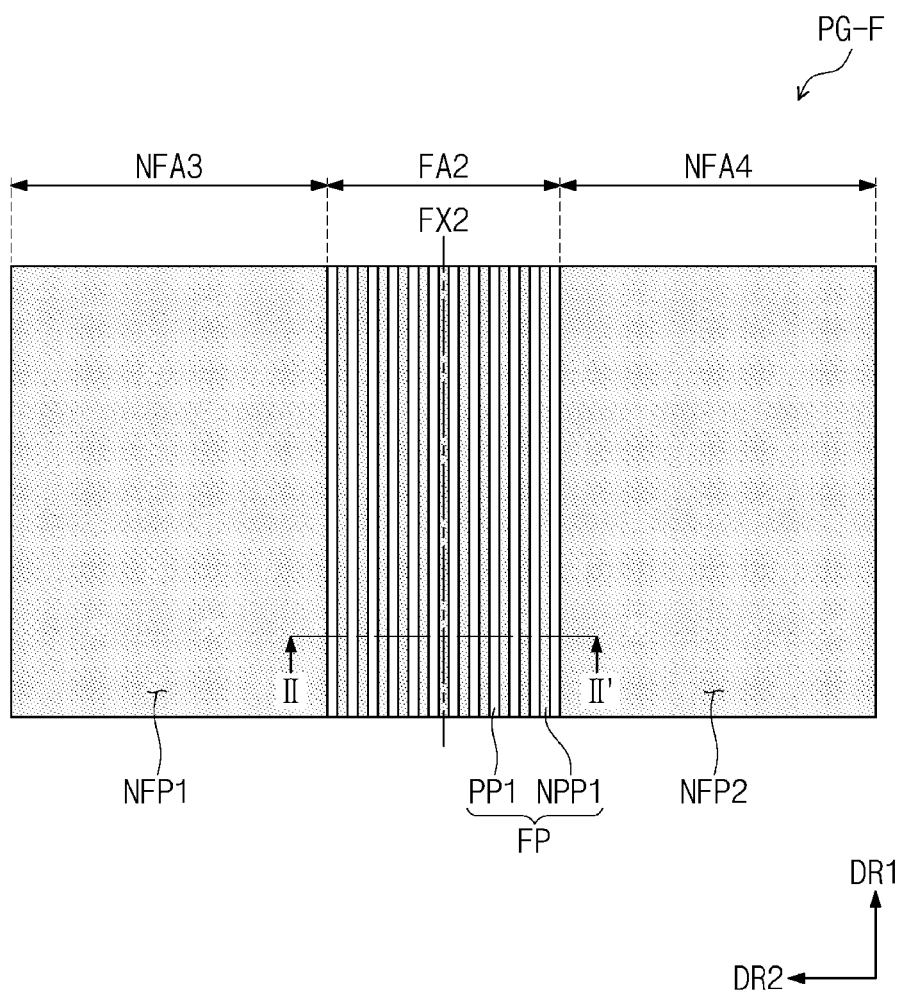
FIG. 6 is a schematic plan view of a pattern glass according to an embodiment.
Figure 7A:
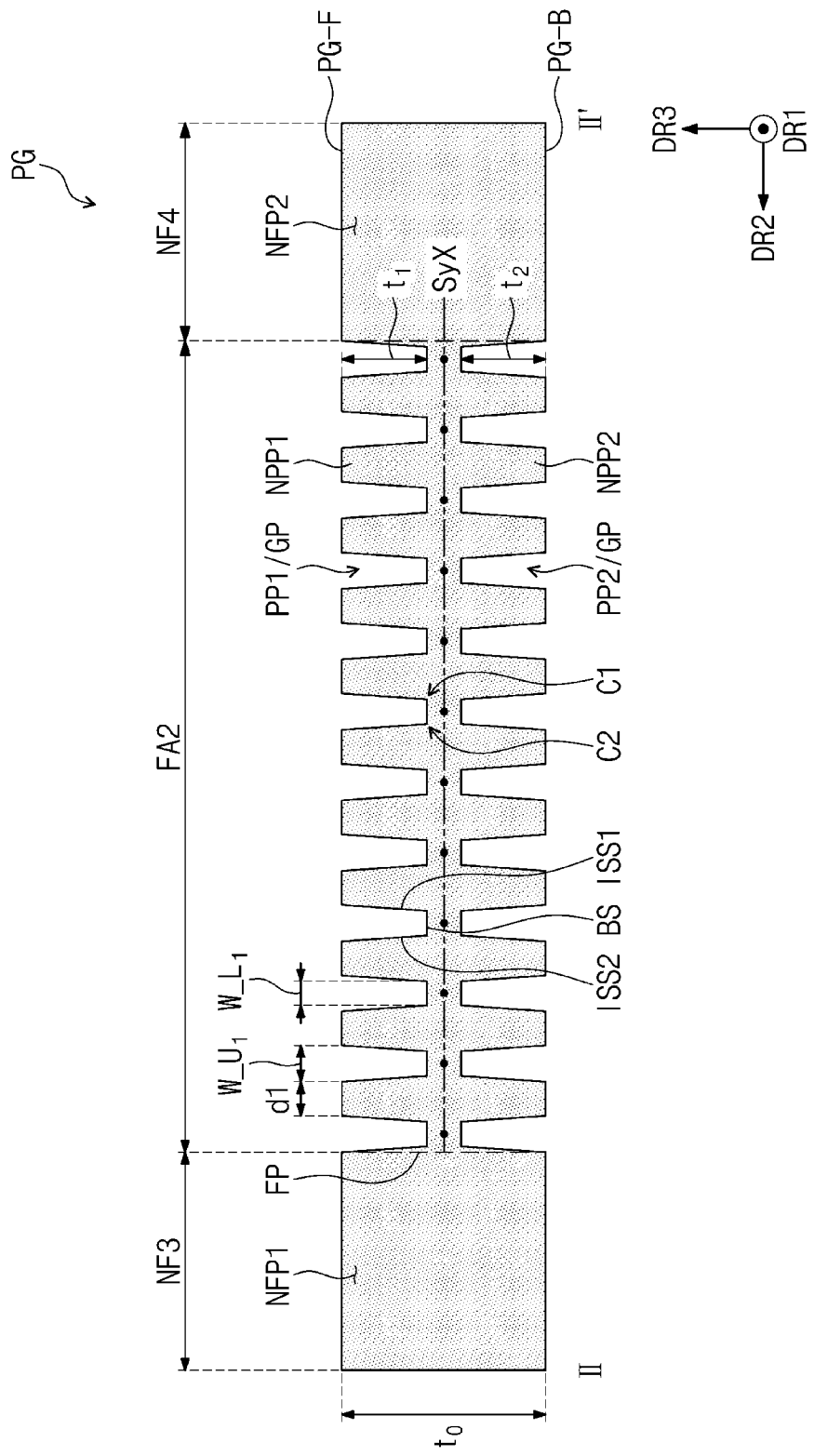
FIG. 7A is a schematic cross-sectional view showing a pattern glass according to embodiments.
Figure 7B:
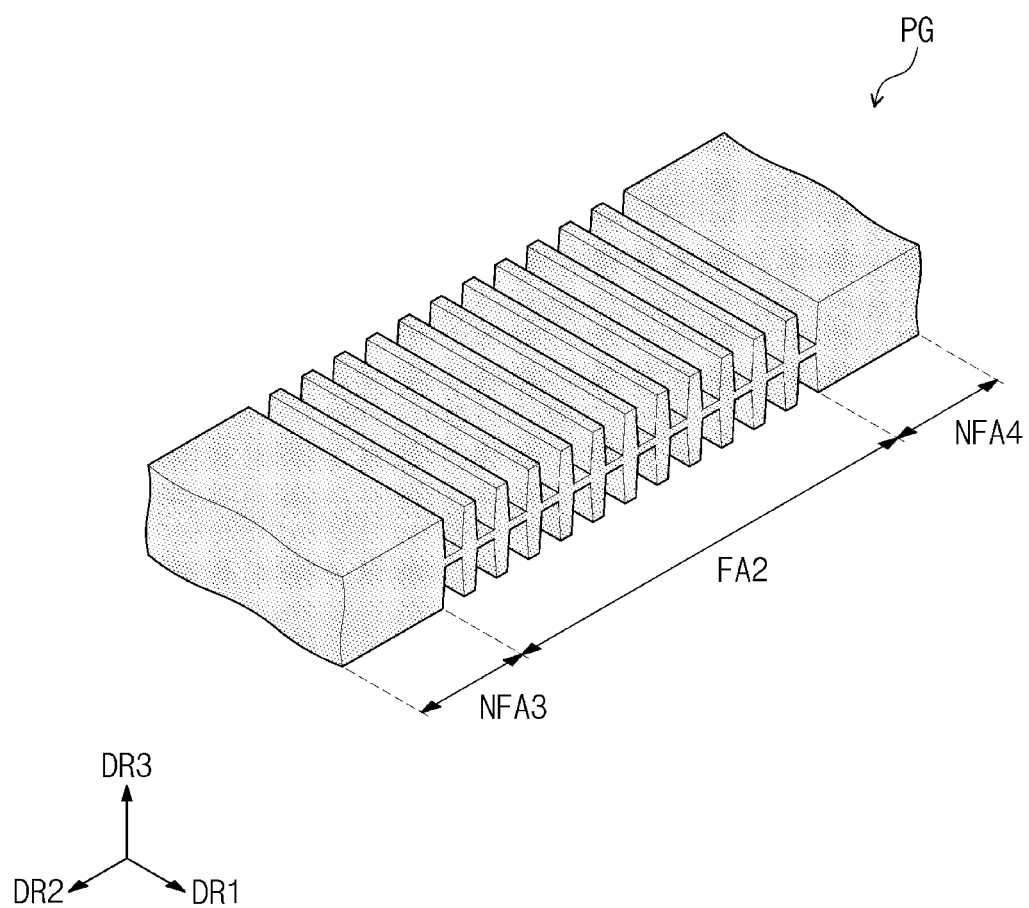
FIG. 7B is a schematic perspective view showing a pattern glass according to embodiments.

Hereinafter, a pattern glass PG according to an embodiment will be described in detail with reference to the drawings. FIG. 6 is a schematic plan view of the upper surface of the pattern glass shown in FIG. 5B. FIG. 7A is a schematic cross-sectional view taken along the cutting line II-II' shown in FIG. 6. FIG. 7B is a schematic perspective view of the pattern glass shown in FIG. 7A.

Referring to FIGS. 6 to 7B, the pattern glass PG may include a folding part FP and non-folding parts NFP1 and NFP2. The folding part FP is disposed corresponding to the folding area FA2. The non-folding parts NFP1 and NFP2 may include a first non-folding part NFP1 corresponding to the first non-folding area NFA3 and a second non-folding part NFP2 corresponding to the second non-folding area NFA4. The folding part FP may be disposed between the first and second non-folding parts NFP1 and NFP2.

The folding part FP may include a first pattern part PP1 and a first non-pattern part NPP1 adjacent to the first pattern part PP1, and a second pattern part PP2 and a second non-pattern part NPP2 adjacent to the second pattern part PP2. Each of the first pattern part PP1 and the second pattern part PP2 may include one groove pattern GP. As an example of the disclosure, the groove pattern GP may have a groove shape recessed from one surface or a surface of the pattern glass PG. For example, the first pattern part PP1 may have a groove shape recessed from the upper surface PG-F of the pattern glass. The second pattern part PP2 may have a groove shape recessed from the lower surface PG-B of the pattern glass.

Referring to FIGS. 6 and 7B, the groove pattern GP may have a stripe shape extending in a direction parallel to the folding axis FX2 (for example, the first direction DR1). A structure in which the first pattern part PP1 may include one groove pattern GP is illustrated. However, the disclosure is not limited thereto, and the first pattern part PP1 and/or the second pattern part PP2 may include groove patterns arranged to be spaced apart from each other in the first direction DR1.

The groove pattern GP may have a trapezoidal shape on a cross-section. The first pattern part PP1 may have a trapezoidal shape with respect to the upper surface PG-F, and the second pattern part PP2 may have a trapezoidal shape with respect to the lower surface PG-B.

Referring to FIG. 7A, the upper end part relatively close to one surface or a surface PG-F or PG-B of the pattern glass of the groove pattern GP may have a width greater than the width of the lower end part relatively far from one side or a side of the pattern glass PG-F or PG-B. For example, in case that the width of the upper end part is referred to as the first width W-U1 and the width of the lower end part is referred to as the second width W-L1, the first width W-U1 may always be greater than the second width W-L1. The sizes of the first width W-U1 and the second width W-L1 may be determined according to folding characteristics. The sizes of the first width W-U1 and the second width W-L1 may be adjusted according to the thickness t1 of the groove pattern GP. However, the disclosure is not limited thereto.

The groove pattern GP may include inner surfaces ISS1 and ISS2 that determine a shape and a bottom surface BS. The inner surface disposed on the first side based on the groove pattern GP is referred to as a first inner surface ISS1, and the inner surface disposed on the second side based on the groove pattern GP is referred to as a second inner surface ISS2. The first and second inner surfaces ISS1 and ISS2 may have an inclined structure inclined at an angle. Each of the first and second inner surfaces ISS1 and ISS2 may be inclined by 1 degree or more with respect to the bottom surface BS. Each of the first and second inner surfaces ISS1 and ISS2 may be inclined with respect to the bottom surface BS by less than about 90 degrees. As the thickness t1 of the groove pattern GP increases, the angle at which each of the first and second inner surfaces ISS1 and ISS2 is inclined with respect to the bottom surface BS may increase.

The bottom surface BS is connected to the first and second inner surfaces ISS1 and ISS2. Here, a portion where the first inner surface ISS1 and the bottom surface BS are connected is defined as a first corner part C1, and a portion where the second inner surface ISS2 and the bottom surface BS are connected is defined as a second corner part C2.

The bottom surface BS may have a flat shape. However, the disclosure is not limited thereto, and the bottom surface BS may have a round shape. The first and second corner parts C1 and C2 may have a flat shape. However, the disclosure is not limited thereto, and the first and second corner parts C1 and C2 may have a round shape.

The folding area FA2 may include first pattern parts PP1. In the first pattern parts PP1, a first non-pattern part NPP1 is provided between two first pattern parts PP1 adjacent to each other. Two adjacent first pattern parts PP1 may be spaced apart from each other by a first interval d1. As an example of the disclosure, the first pattern parts PP1 may be spaced apart from each other at regular intervals in the second direction DR2.

The folding area FA2 may include second pattern parts PP2. In the second pattern parts PP2, a second non-pattern part NPP2 is provided between two adjacent second pattern parts PP2. Two adjacent first pattern parts PP1 may be spaced apart from each other by a first interval d1. As an example of the disclosure, the second pattern parts PP2 may be spaced apart from each other at regular intervals in the second direction DR2.

The first interval d1 may be referred to as a width of the non-pattern part NPP1 or NPP2. The first interval d1 may be smaller than the first width W-U1. In case that the first interval d1 is greater than the first width W-U1, the folding characteristic of the folding part FP may be deteriorated. The first interval d1 may be the same in the entire folding area FA2. However, the disclosure is not limited thereto, and the first interval d1 may be different from each other or some may be different from each other in the entire area of the folding area FA2 as needed.

The thickness t0 of the first and second non-folding parts NFP1 and NFP2 may be the same as the thickness t0 of the pattern glass PG. The impact resistance of the glass window WM may be determined according to the length of the thickness t0 of the first and second non-folding parts NFP1 and NFP2. For example, as t0 increases, the amount of deformation of the glass window WM with respect to an external impact may decrease, and a cracking phenomenon caused by an external impact may be improved. As an example of the disclosure, t0 may have a size in a range of about 100 μm to about 1000 μm. As another example of the disclosure, t0 may have a size of in a range of about 200 μm to about 400 μm.

In an embodiment, all of the groove patterns GP included in the first pattern parts PP1 may have the same thickness t1. All of the groove patterns GP included in the second pattern parts PP2 may have the same thickness t2. In the disclosure, the same number of lengths and the like may include an error range within about 10% or within about 5%.

The thickness t1 of the groove pattern GP included in the first pattern part PP1 may be the same as the thickness t2 of the groove pattern GP included in the second pattern part PP2. For example, the first pattern part PP1 and the second pattern part PP2 may include the groove patterns GP having the same shape and size. The sum of the thickness t1 of the first pattern part and the thickness t2 of the second pattern part may be smaller than the thickness t0 of the pattern glass PG. The axis of symmetry SyX is the same as a line connecting the central point (a point having a length of ½ to from one surface or a surface) of the pattern glass PG, and may have a central straight line shape. In the disclosure, the symmetry axis SyX may be a line connecting the center of the bottom surface BS between the first pattern part PP1 and the second pattern part PP2 closest to each other in the third direction DR3. The symmetry axis SyX may be a line drawn in the center part of the pattern glass PG so as not to overlap the groove patterns included in the first pattern part PP1 and the second pattern part PP2.

The first pattern part PP1 and the second pattern part PP2 may be disposed to be symmetrical to each other in the third direction DR3. For example, the first pattern part PP1 and the second pattern part PP2 may be disposed at the same position in the second direction DR2. In case that folded based on the symmetry axis SyX, the first pattern part PP1 and the second pattern part PP2 may overlap each other.

FIGS. 8A to 8D are schematic cross-sectional views illustrating pattern glass according to embodiments. However, among the components shown in FIGS. 8A to 8D, the same reference numerals are used for the same components as those shown in FIG. 7A, and a detailed description thereof will be omitted, and differences from FIG. 7A will be described.

Figure 8A:
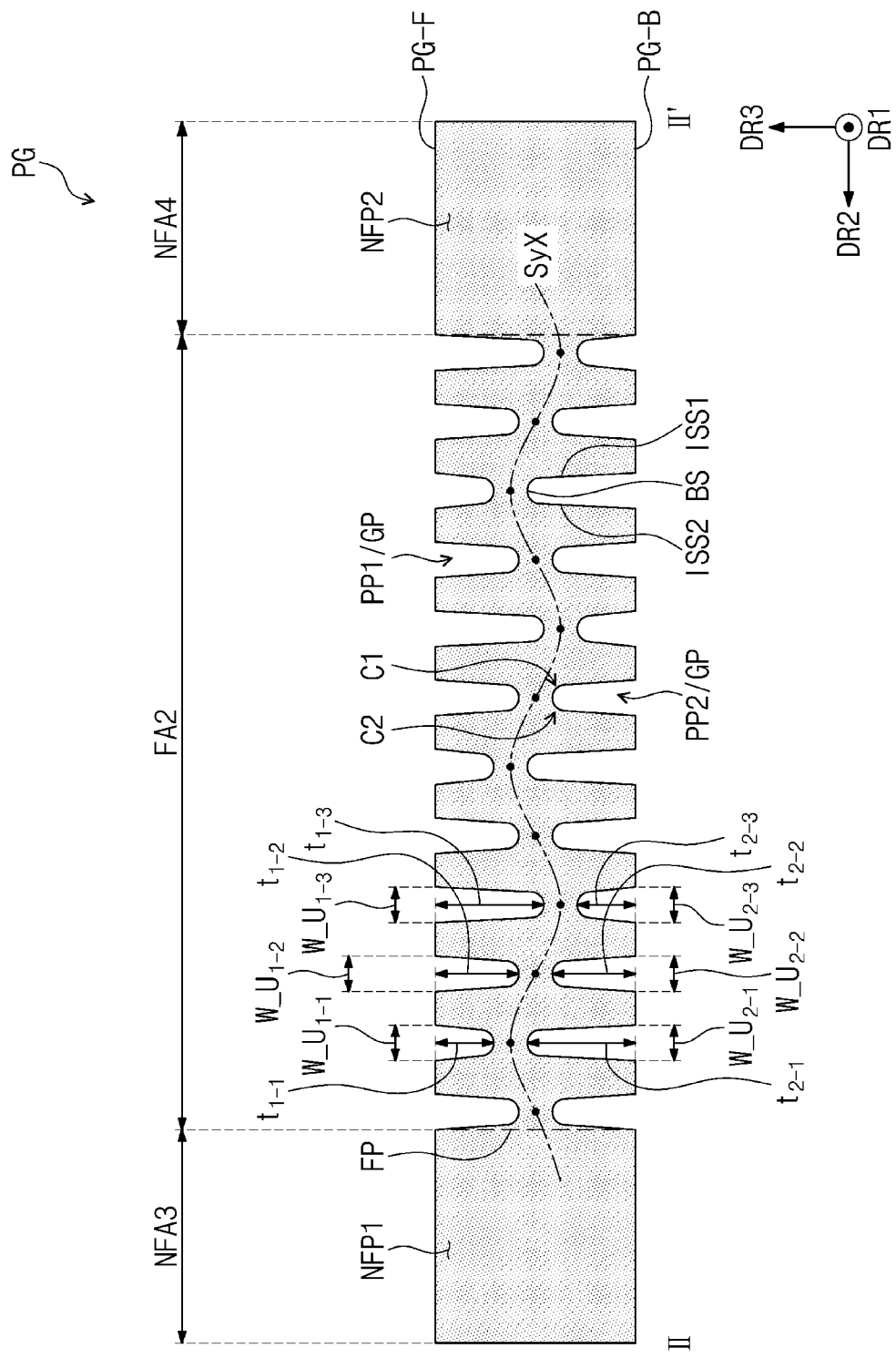
FIGS. 8A to 8D are schematic cross-sectional views illustrating pattern glass according to embodiments.

Referring to FIG. 8A, as an example of the disclosure, the bottom surface BS of the groove pattern GP may have a round shape. Also, the first and second corner parts C1 and C2 may have a round shape.

In one embodiment, at least one of the first pattern parts PP1 may have a groove pattern GP having a different thickness. All of the first pattern parts PP1 may have different thicknesses from other adjacent first pattern parts PP1. For example, the groove patterns GP having different thicknesses included in three successive first pattern parts PP1 among the first pattern parts PP1 may be continuously repeated. In the successive first pattern part PP1, the thickness of the groove patterns may have a relationship of t1-3>t1-2>t1-1. Also, the groove patterns GP having different thicknesses may have different first widths. The first width may increase as the thickness of the groove pattern GP increases, and the first widths of the groove patterns may have a relationship of W_U1-3>W_U1-2>W_U1-1.

In one embodiment, at least one of the second pattern parts PP2 may have a groove pattern GP having a different thickness. All of the second pattern parts PP2 may have different thicknesses from other adjacent second pattern parts PP2. For example, the groove patterns GP having different thicknesses included in three successive second pattern parts PP2 among the second pattern parts PP2 may be continuously repeated. In the successive second pattern part PP2, the thickness of the groove patterns may have a relationship of t2-3>t2-2>t2-1. Also, the groove patterns GP having different thicknesses may have different first widths. The first width may increase as the thickness of the groove pattern GP increases, and the widths of the groove patterns may have a relationship of W_U2-3>W_U2-2>W_U2-1.

In the third direction DR3, the thickness t1-1 of the groove pattern included in the first pattern part PP1 and the thickness t2-3 of the groove pattern included in the second pattern part PP2, which are symmetrical to each other, may be different from each other. The sum of the thickness t1-1 of the groove pattern included in the first pattern part PP1 and the thickness t2-3 of the groove pattern included in the second pattern part PP2 may be smaller than the thickness t0 of the pattern glass PG. The symmetry axis SyX may be in the form of a wave-shaped curve.

Figure 8B:
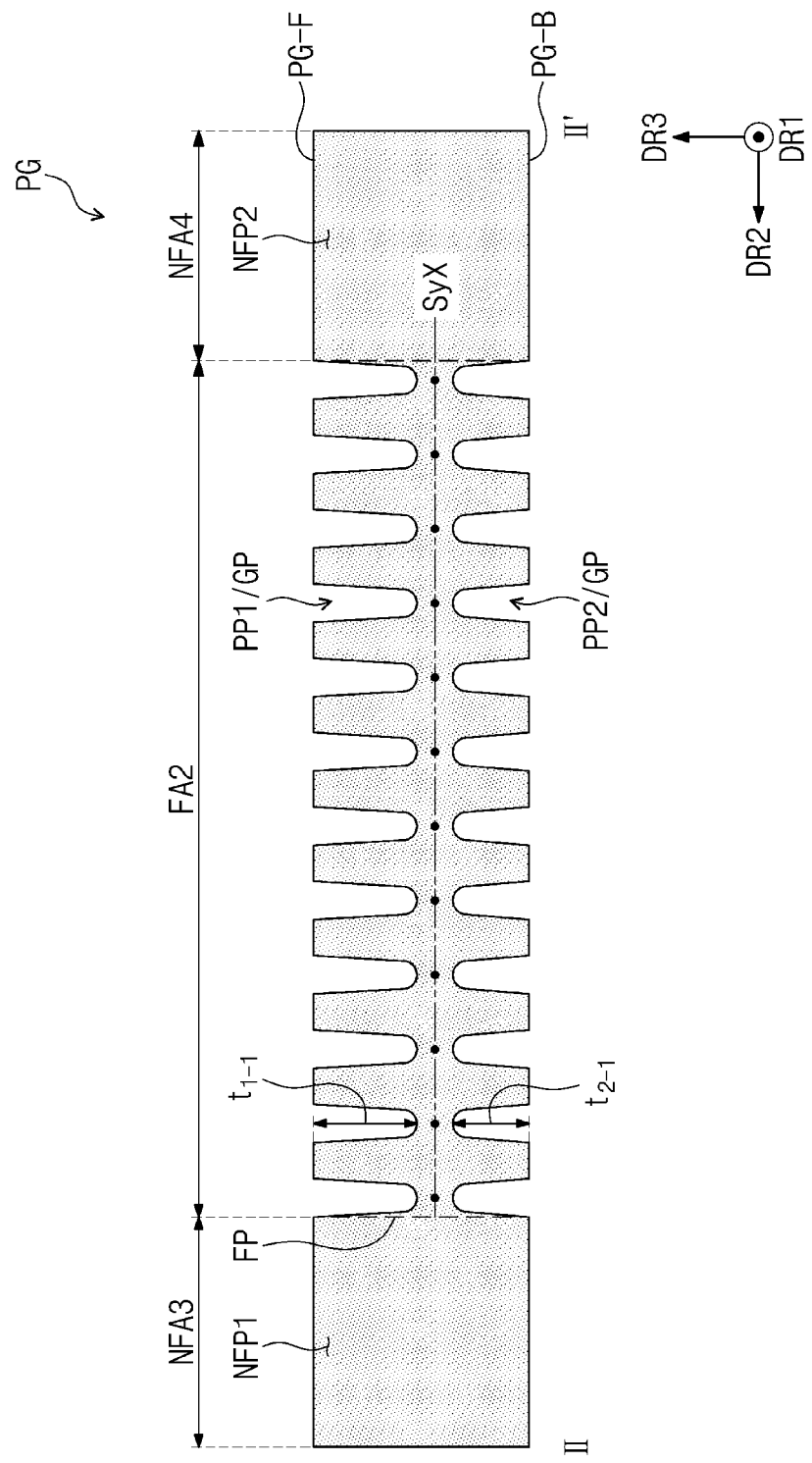

Referring to FIG. 8B, in an embodiment, all of the groove patterns GP included in the first pattern parts PP1 may have the same thickness t1-1. All of the groove patterns GP included in the second pattern parts PP2 may have the same thickness t2-1.

A thickness t1-1 of the groove pattern GP included in the first pattern part PP1 may be different from a thickness t2-1 of the groove pattern GP included in the second pattern part PP2. For example, the thickness t1-1 of the groove pattern GP included in the first pattern part PP1 may be greater than the thickness t2-1 of the groove pattern GP included in the second pattern part PP2. The sum of the thickness t1-1 of the first pattern part and the thickness t2-1 of the second pattern part may be smaller than the thickness t0 of the pattern glass PG. The symmetry axis SyX may be drawn relatively closer to the lower surface PG-B of the pattern glass PG, and may have a straight line shape.

Although not shown, in relation to the groove pattern GP included in the second pattern part PP2, the thickness t2-1 may be greater than the thickness t1-1 of the groove pattern GP included in the first pattern part PP1. The sum of the thickness t1-1 of the first pattern part and the thickness t2-1 of the second pattern part may be smaller than the thickness t0 of the pattern glass PG. The symmetry axis SyX may be drawn relatively closer to the upper surface PG-F of the pattern glass PG, and may have a straight line shape.

Figure 8C:
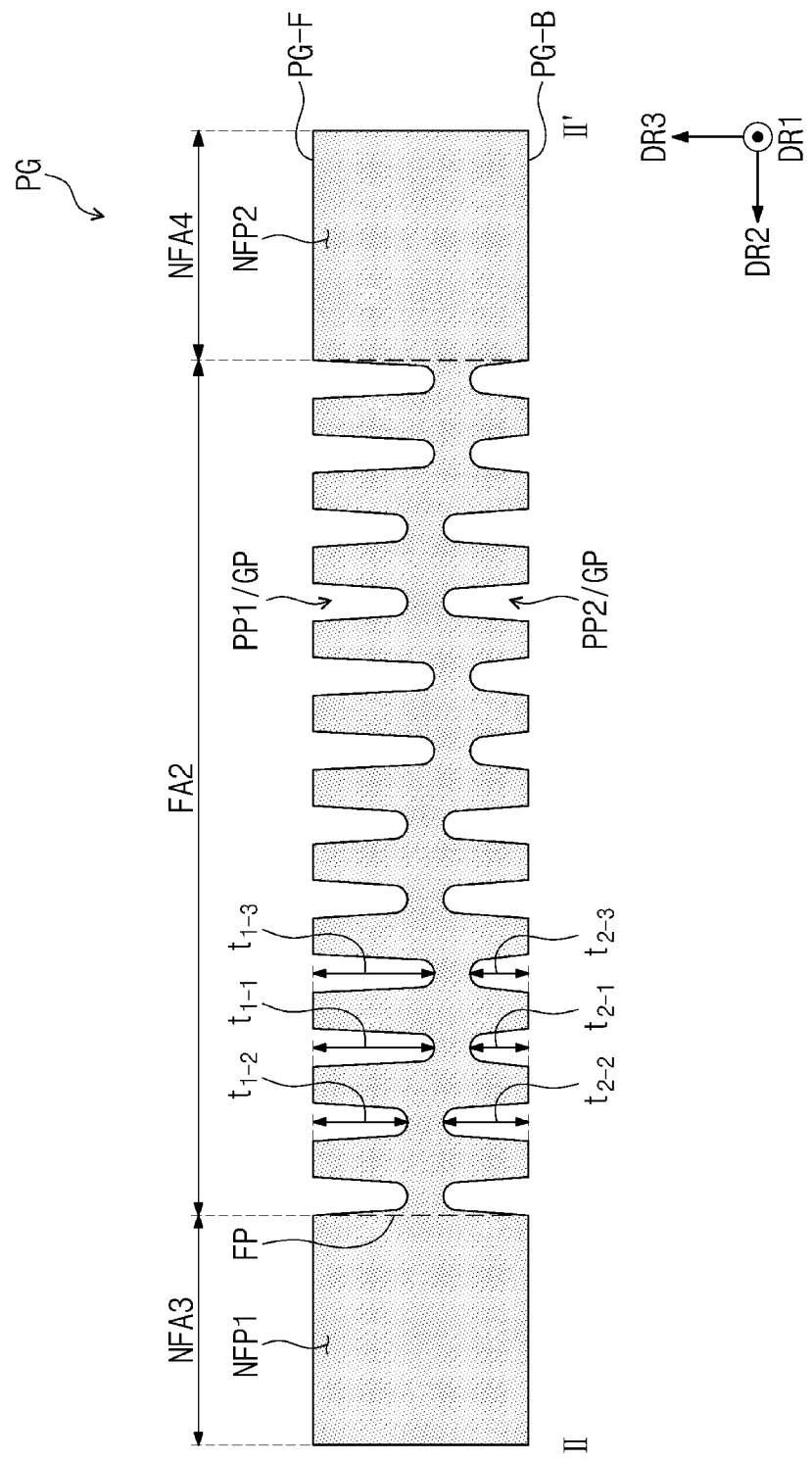

Referring to FIG. 8C, according to an embodiment, at least one of the first pattern parts PP1 may have a groove pattern GP having a different thickness. It may have a thickness different from one adjacent one of the three successive first pattern parts PP1 and the same thickness as the other one. In the successive first pattern part PP1, the thickness of the groove patterns may have a relationship of t1-3=t1-1>t1-2.

In one embodiment, at least one of the second pattern parts PP2 may have a groove pattern GP having a different thickness. It may have a thickness different from any one of the three successive second pattern parts PP2 and the same thickness as the other adjacent one. In the successive second pattern part PP2, thicknesses of the groove patterns may have a relationship of t2-3=t2-1<t2-2.

Figure 8D:
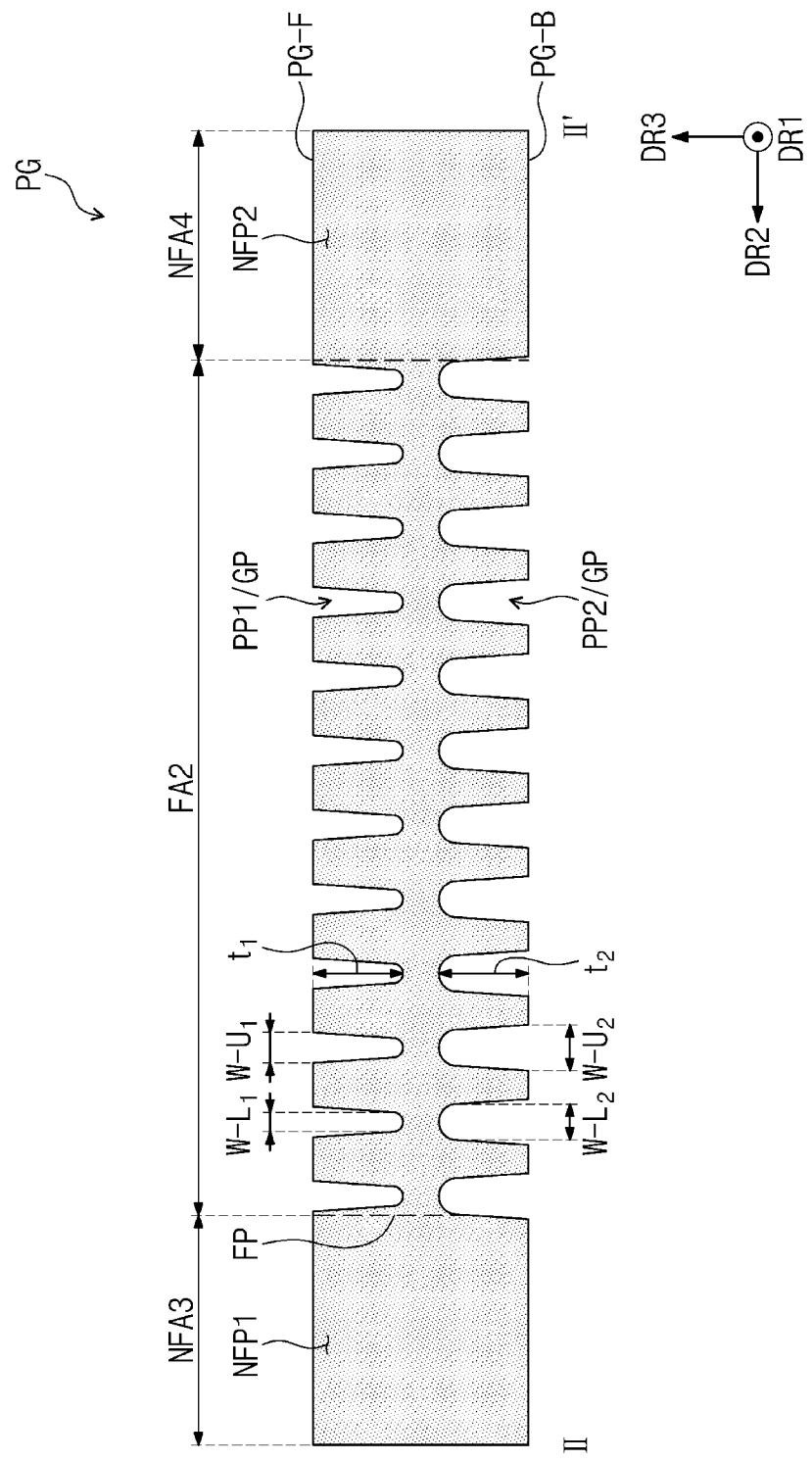

Referring to FIG. 8D, in an embodiment, the size of the groove pattern GP included in the first pattern part PP1 and the size of the groove pattern GP included in the second pattern part PP2 may be different. In other words, the first width W-U1 of the first pattern part PP1 and the first width W-U2 of the second pattern part PP2 may be different from each other, and the second width W-L1 of the first pattern part PP1 and the second width W-L2 of the second pattern part PP2 may be different from each other. Although it is illustrated that the thicknesses of the first pattern parts PP1 and the second pattern parts PP2 are the same (t1=t2) in FIG. 8D, the disclosure is not limited thereto. For example, as in FIGS. 8A to 8C, thicknesses of the first pattern parts PP1 and the second pattern parts PP2 may be different from each other, or only some of the thicknesses may be different from each other.

In one example of the disclosure, the first width W-U1 of the first pattern part PP1 may be smaller than the first width W-U2 of the second pattern part PP2, and the second width W-L1 of the first pattern part PP1 may be smaller than the second width W-L2 of the second pattern part PP2. The pattern glass (PG) may more readily reduce the impact transmitted from the lower portion, so that the user's touch feeling of the display device may be improved.

Although not shown, the first width W-U1 of the first pattern part PP1 may be greater than the first width W-U2 of the second pattern part PP2, and the second width W-L1 of the first pattern part PP1 may be greater than the second width W-L2 of the second pattern part PP2. This pattern glass PG is more advantageous than in case that filling the filler in the first pattern part PP1, and in case that folding, the internal stress of the pattern glass PG may be reduced.

Figure 9:
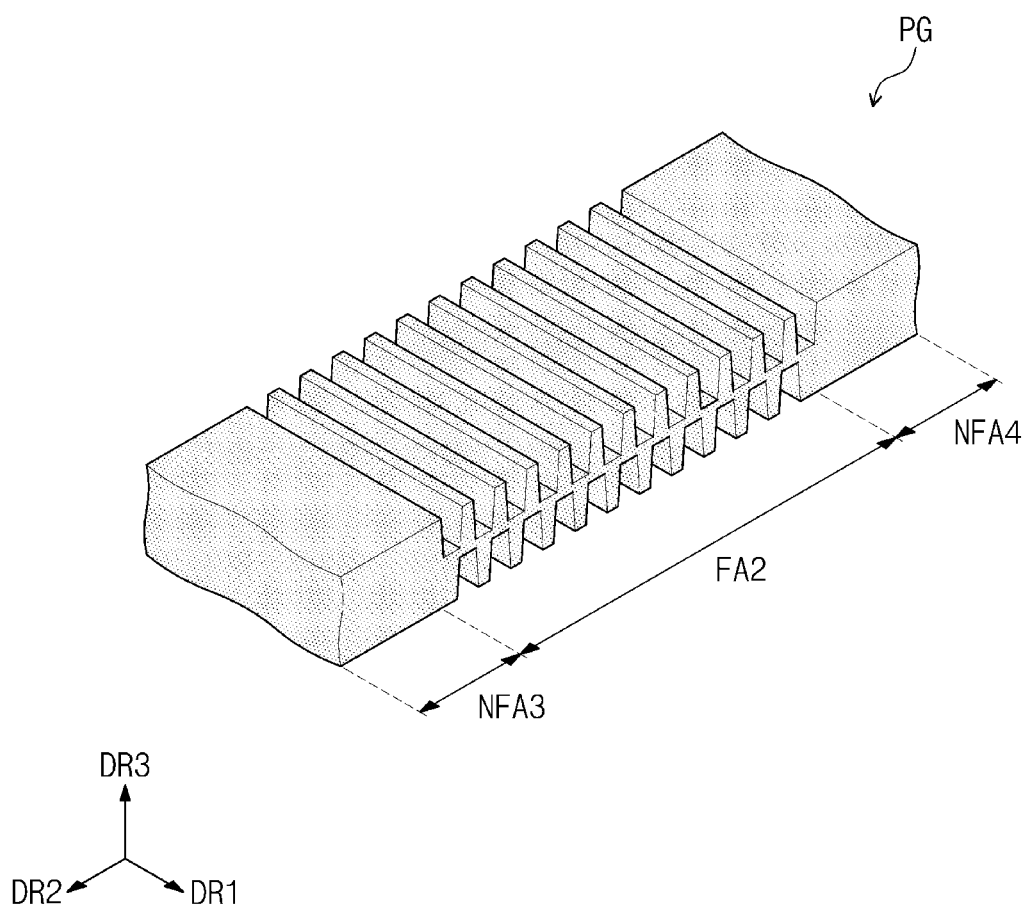
FIG. 9 is a schematic perspective view showing a pattern glass according to an embodiment.
Figure 10A:
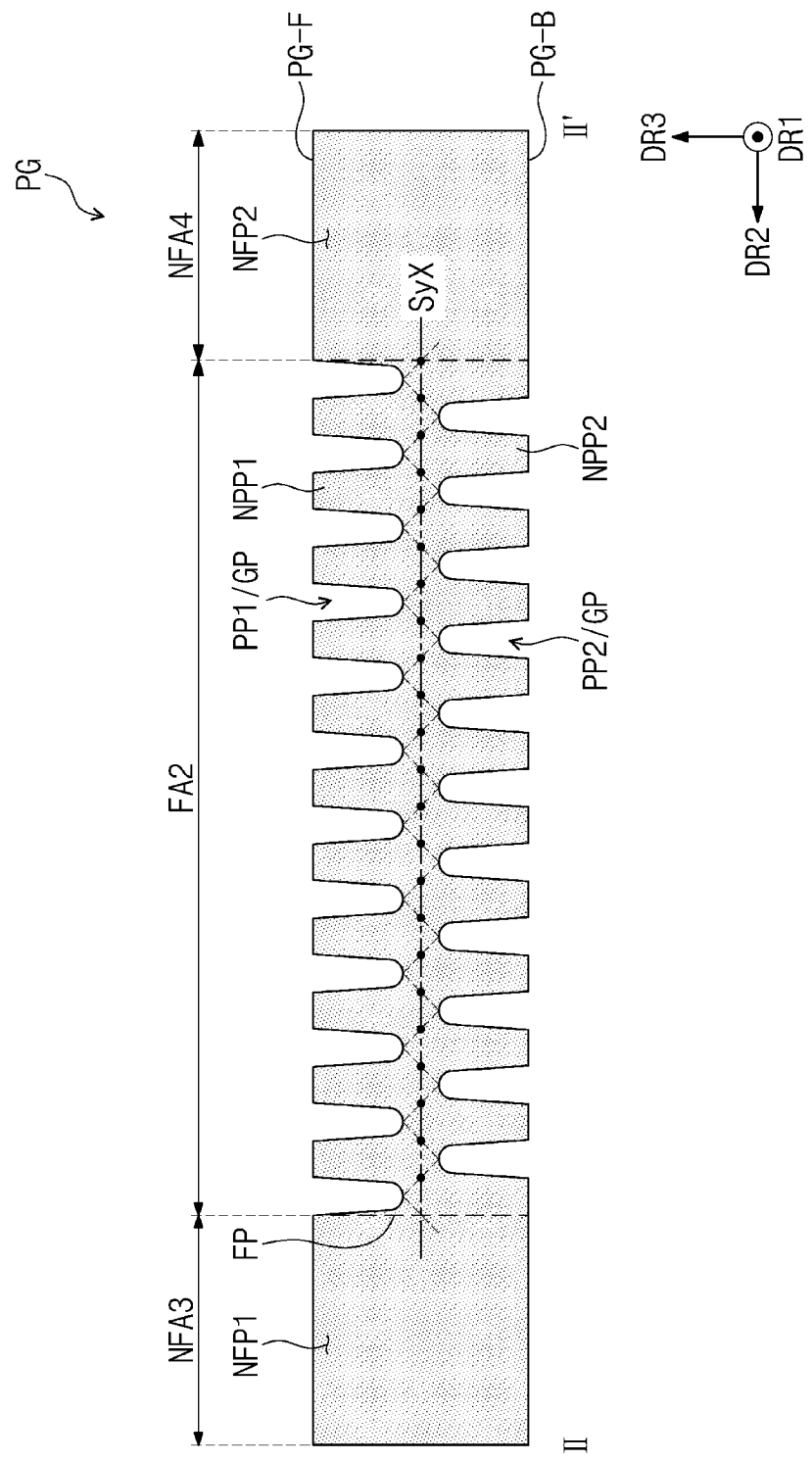
FIGS. 10A to 10D are schematic cross-sectional views illustrating pattern glass according to embodiments.

FIG. 9 is a schematic perspective view showing a pattern glass according to embodiments. FIGS. 10A to 10D are schematic cross-sectional views illustrating pattern glass according to embodiments. FIG. 10A is a schematic cross-sectional view illustrating a cross-section of the pattern glass shown in FIG. 9. However, among the components shown in FIGS. 9 to 10D, the same reference numerals are used for the same components as those shown in FIGS. 7A to 8D, and detailed descriptions thereof will be omitted, and differences will be described.

Figure 10B:
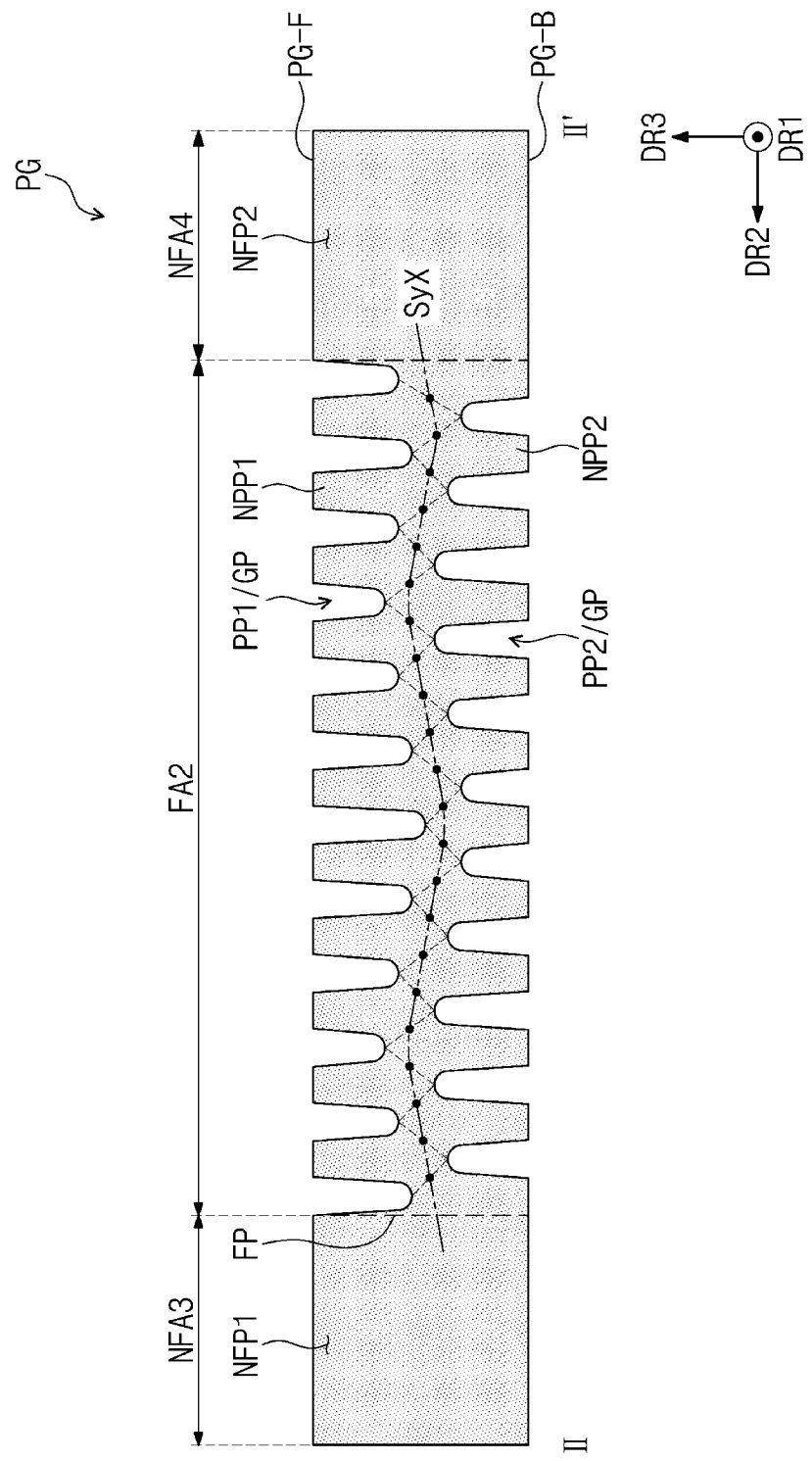
Figure 10C:
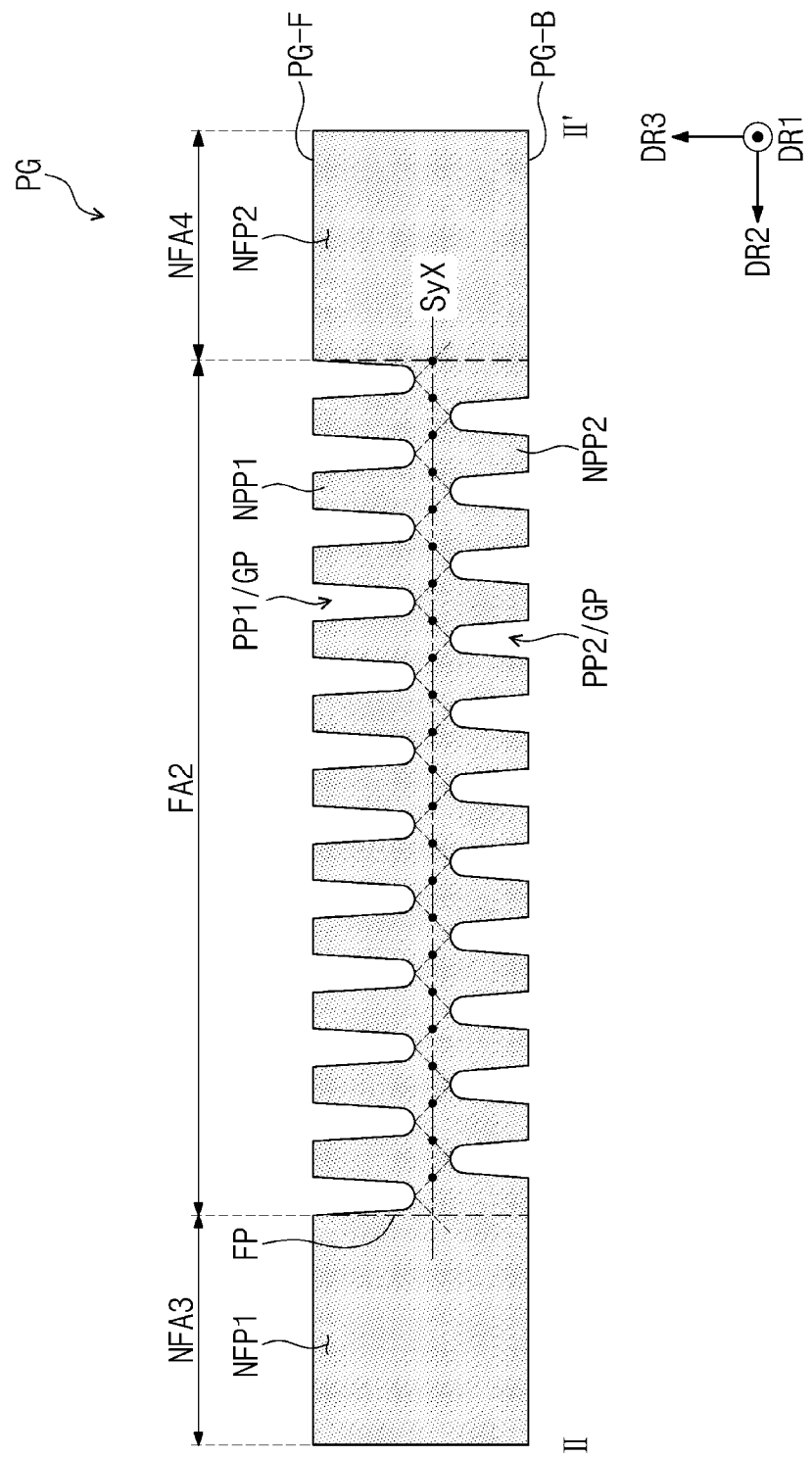
Figure 10D:
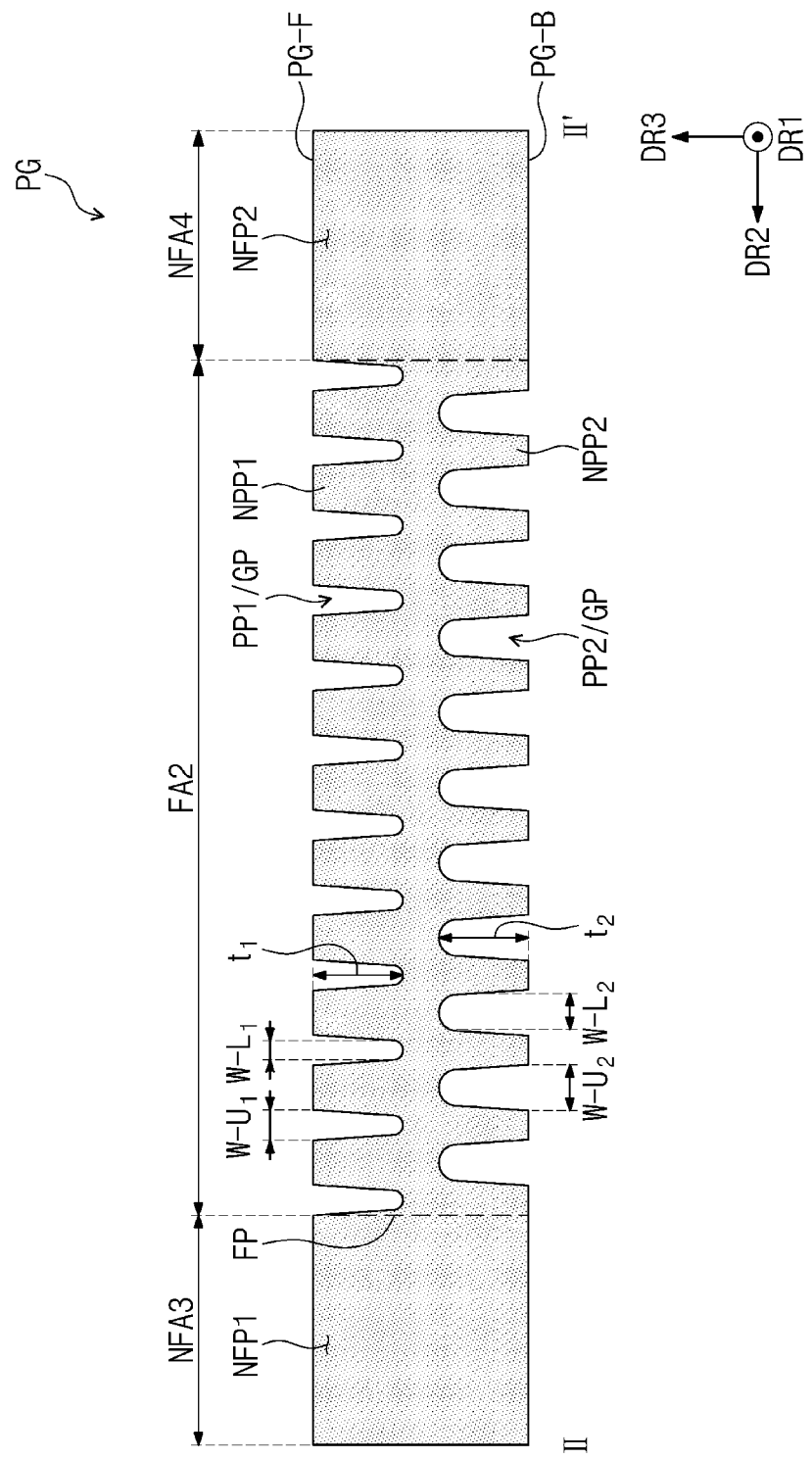

Referring to FIGS. 9 to 10D, the first pattern part PP1 and the second pattern part PP2 may be arranged to be asymmetrical to each other in the third direction DR3. For example, the first pattern part PP1 and the second pattern part PP2 may not be arranged at the same position along the second direction DR2. In the second direction DR2, the first pattern part PP1 may be arranged at the same position as the second non-pattern part NPP2, and the second pattern part PP2 may be arranged at the same position as the first non-pattern part NPP1.

The same description as in FIG. 7A may be applied to the pattern glass PG of FIG. 10A except that the first pattern part PP1 and the second pattern part PP2 are arranged to be asymmetrical to each other in the third direction DR3. The thicknesses of the groove patterns GP included in the first pattern parts PP1 and the thicknesses of the groove patterns GP included in the second pattern parts PP2 are all the same, and the first pattern part PP1 and the second pattern part PP2 may include a groove pattern GP having the same shape. The symmetry axis SyX is the same as the line connecting the center points of the pattern glass PG, and may have a straight line shape in the center. Also, in case that the pattern glass PG is folded, the folding axis of the first pattern part PP1 and the second pattern part PP2 may be the same center line as the symmetry axis SyX. On the other hand, there may be two first pattern parts PP1 closest to the second pattern part PP2 in the third direction DR3, and the symmetry axis SyX may be a line connecting each of the two first pattern parts PP1 and the center of the bottom surface.

The same description as in FIG. 8A may be applied to the pattern glass PG of FIG. 10B except that the first pattern part PP1 and the second pattern part PP2 are arranged to be asymmetrical to each other in the third direction DR3.

At least one of the first pattern parts PP1 may have a groove pattern GP having a different thickness. All of the first pattern parts PP1 may have different thicknesses from other adjacent first pattern parts PP1. For example, the groove patterns GP having different thicknesses included in three successive first pattern parts PP1 among the first pattern parts PP1 may be continuously repeated. In one embodiment, at least one of the second pattern parts PP2 may have a groove pattern GP having a different thickness. All of the second pattern parts PP2 may have different thicknesses from other adjacent second pattern parts PP2. For example, the groove patterns GP having different thicknesses included in three successive second pattern parts PP2 among the second pattern parts PP2 may be continuously repeated. The symmetry axis SyX may be in the form of a wave-shaped curve. On the other hand, there may be two first pattern parts PP1 closest to the second pattern part PP2 in the third direction DR3, and the symmetry axis SyX may be a line connecting the centers of the bottom surfaces of the second pattern part PP2 and the two closest first pattern parts PP1 respectively.

The same description as in FIG. 8B may be applied to the pattern glass PG of FIG. 10C except that the first pattern part PP1 and the second pattern part PP2 are arranged to be asymmetrical to each other in the third direction DR3.

The groove patterns GP included in the first pattern parts PP1 may all have the same thickness. All of the groove patterns GP included in the second pattern parts PP2 may have the same thickness. However, the thickness of the groove pattern GP included in the first pattern part PP1 may be different from the thickness of the groove pattern GP included in the second pattern part PP2. For example, the thickness of the groove pattern GP included in the first pattern part PP1 may be greater than the thickness of the groove pattern GP included in the second pattern part PP2. The sum of the thickness of the first pattern part and the thickness of the second pattern part may be smaller than the thickness of the pattern glass PG. The symmetry axis SyX may be drawn relatively closer to the lower surface PG-B of the pattern glass PG, and may have a straight line shape.

Although not illustrated, the thickness of the groove pattern GP included in the second pattern part PP2 may be greater than the thickness of the groove pattern GP included in the first pattern part PP1. The sum of the thickness of the first pattern part and the thickness of the second pattern part may be smaller than the thickness of the pattern glass PG. The symmetry axis SyX may be drawn relatively closer to the upper surface PG-F of the pattern glass PG, and may have a straight line shape.

The same description as in FIG. 8D may be applied to the pattern glass PG of FIG. 10D except that the first pattern part PP1 and the second pattern part PP2 are arranged to be asymmetrical to each other in the third direction DR3. Although it is illustrated that the thicknesses of the first pattern parts PP1 and the second pattern parts PP2 are the same (t1=t2) in FIG. 10D, the disclosure is not limited thereto. For example, as in FIGS. 10A to 10C, thicknesses of the first pattern parts PP1 and the second pattern parts PP2 may be different from each other, or only some of the thicknesses may be different from each other.

In one embodiment, in case that the first pattern part PP1 and the second pattern part PP2 are arranged to be asymmetric to each other in the third direction DR3, the size of the groove pattern GP included in the first pattern part PP1 and the size of the groove pattern GP included in the second pattern part PP2 may be different from each other. The first width W-U1 of the first pattern part PP1 may be smaller than the first width W-U2 of the second pattern part PP2, and the second width W-L1 of the first pattern part PP1 may be smaller than the second width W-L2 of the second pattern part PP2. Although not shown, the first width W-U1 of the first pattern part PP1 may be greater than the first width W-U2 of the second pattern part PP2, and the second width W-L1 of the first pattern part PP1 may be greater than the second width W-L2 of the second pattern part PP2.

Figure 11A:
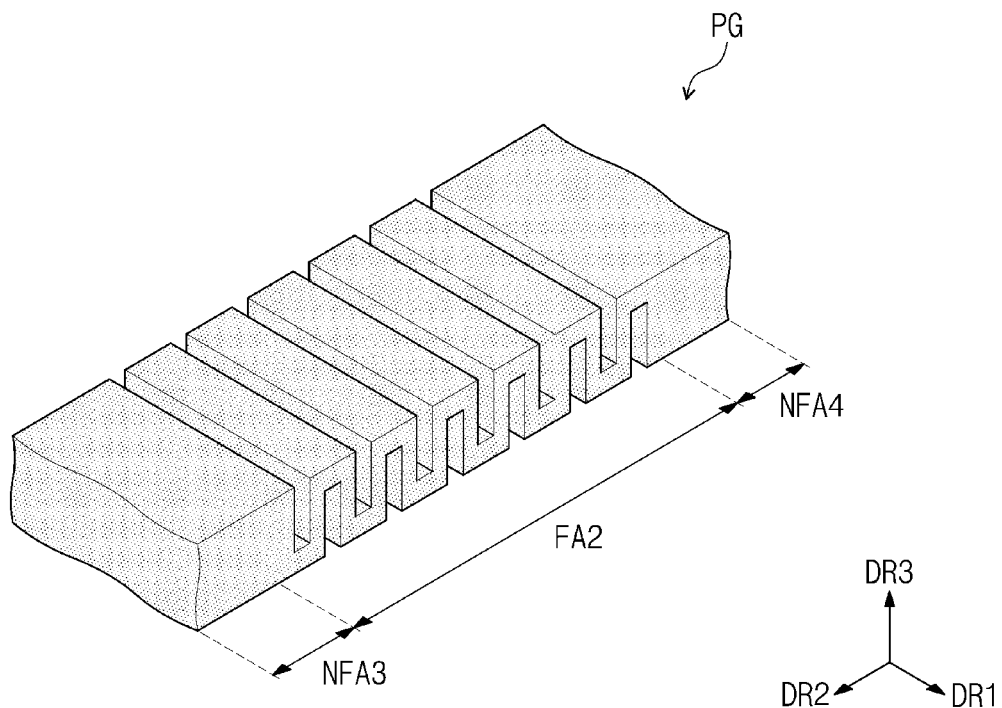
FIGS. 11A and 11B are schematic perspective views illustrating a pattern glass according to embodiments.
Figure 11B:
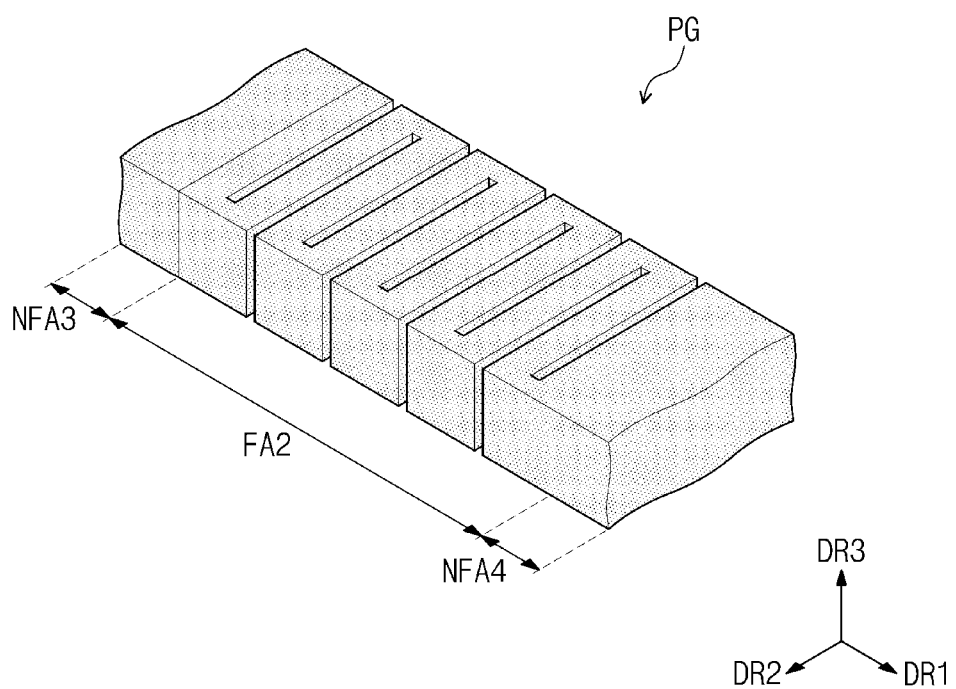
Figure 12A:
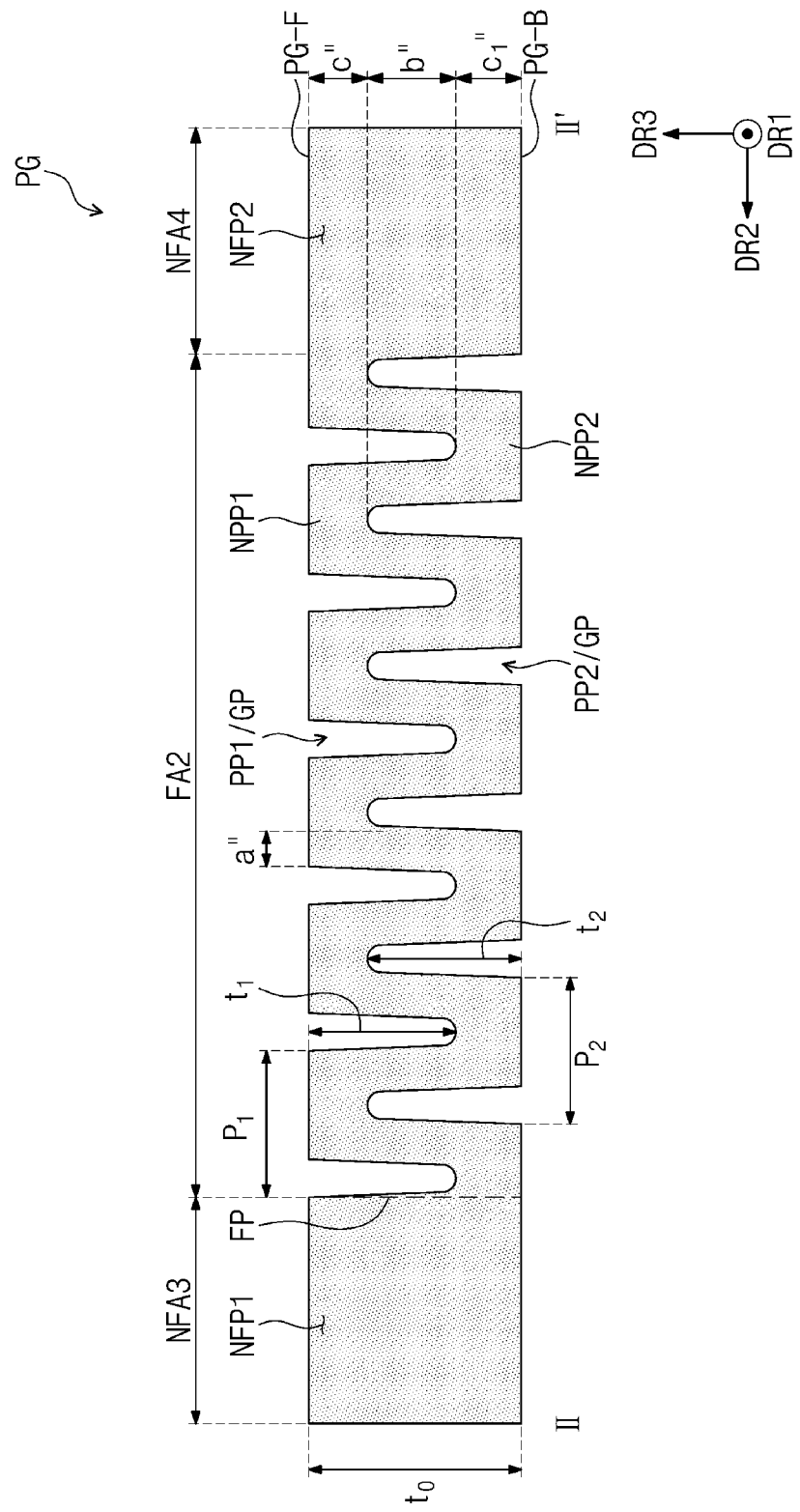
FIGS. 12A to 12D are schematic cross-sectional views illustrating pattern glass according to embodiments.
Figure 12B:
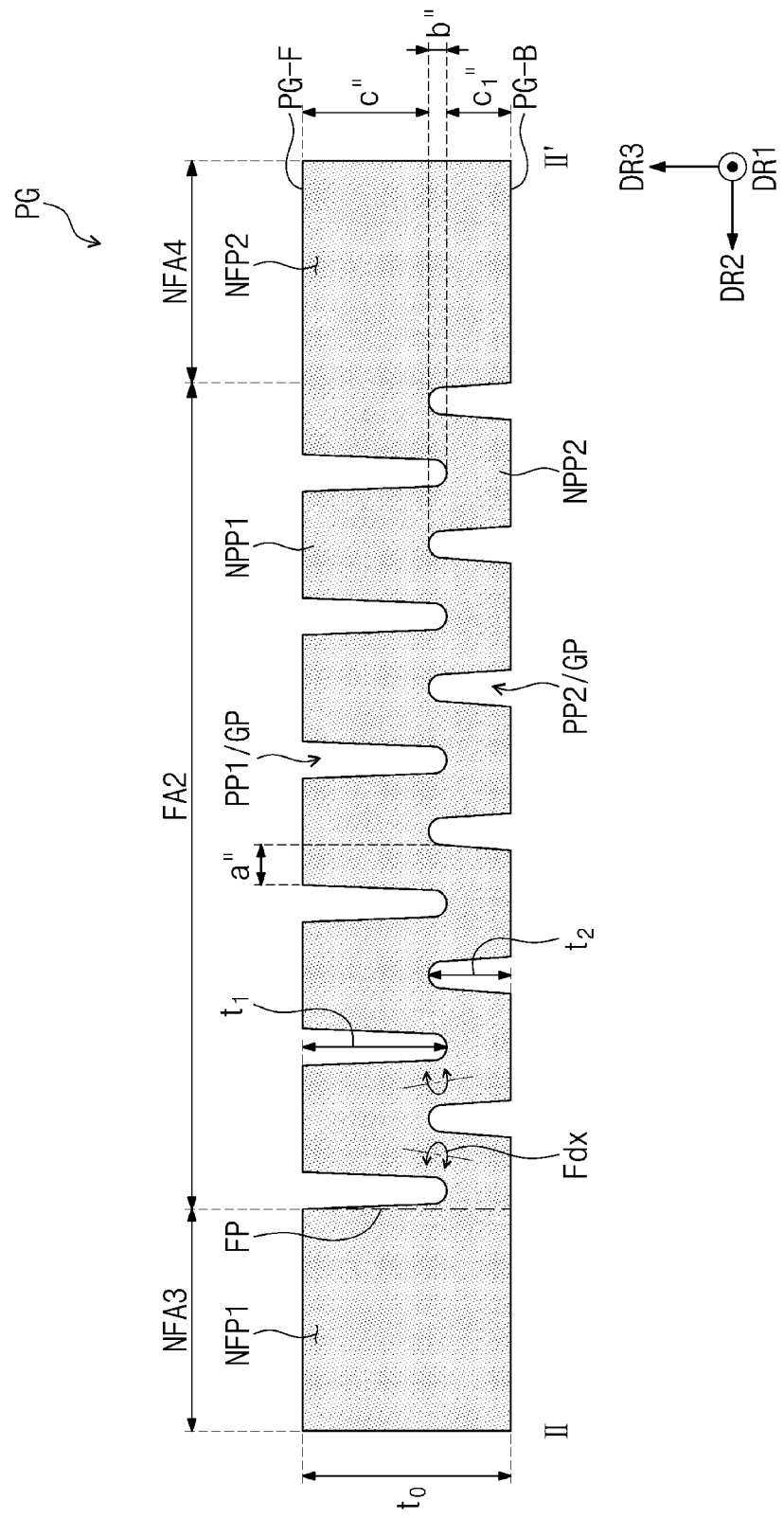
Figure 12C:
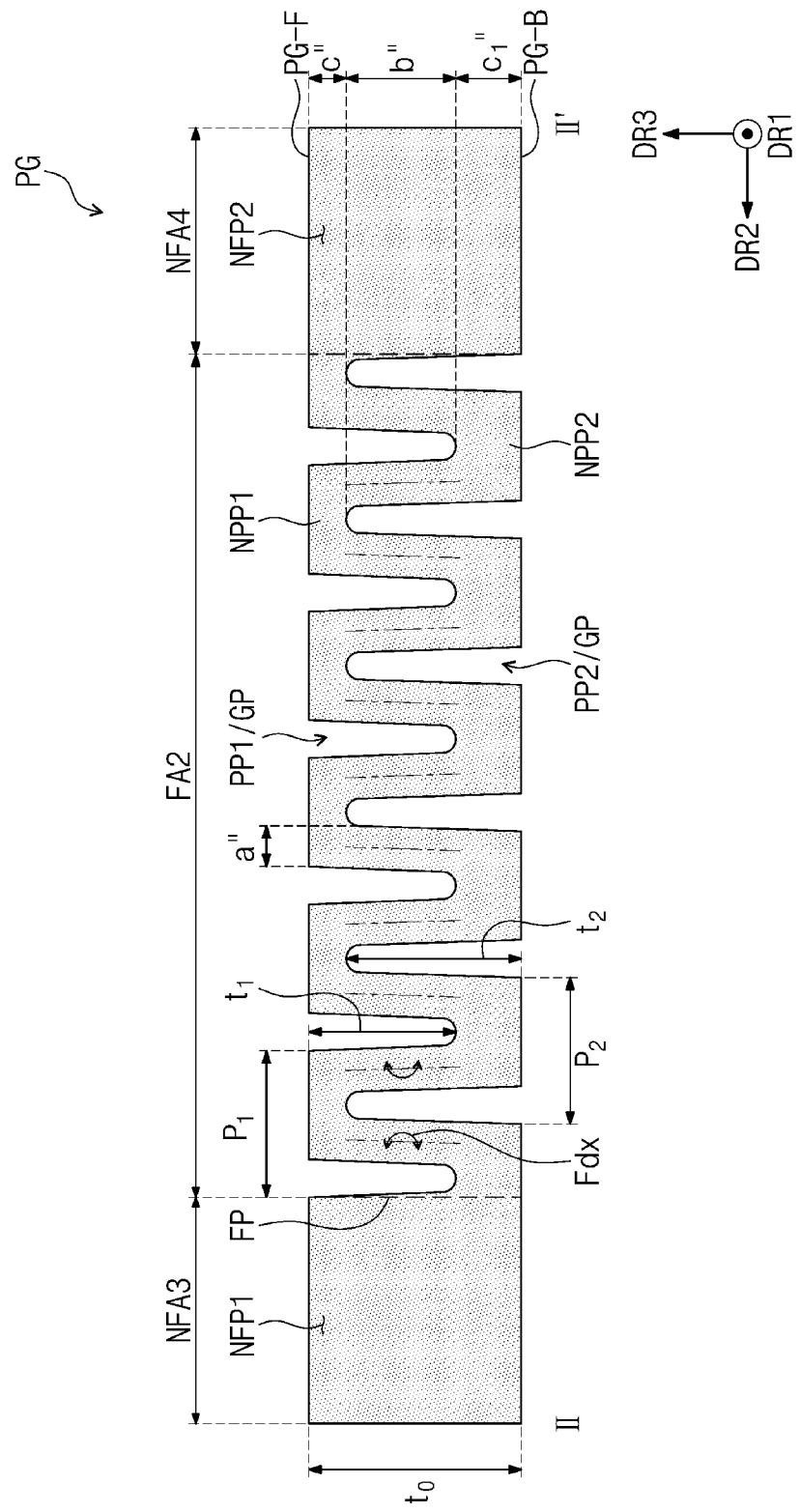
Figure 12D:
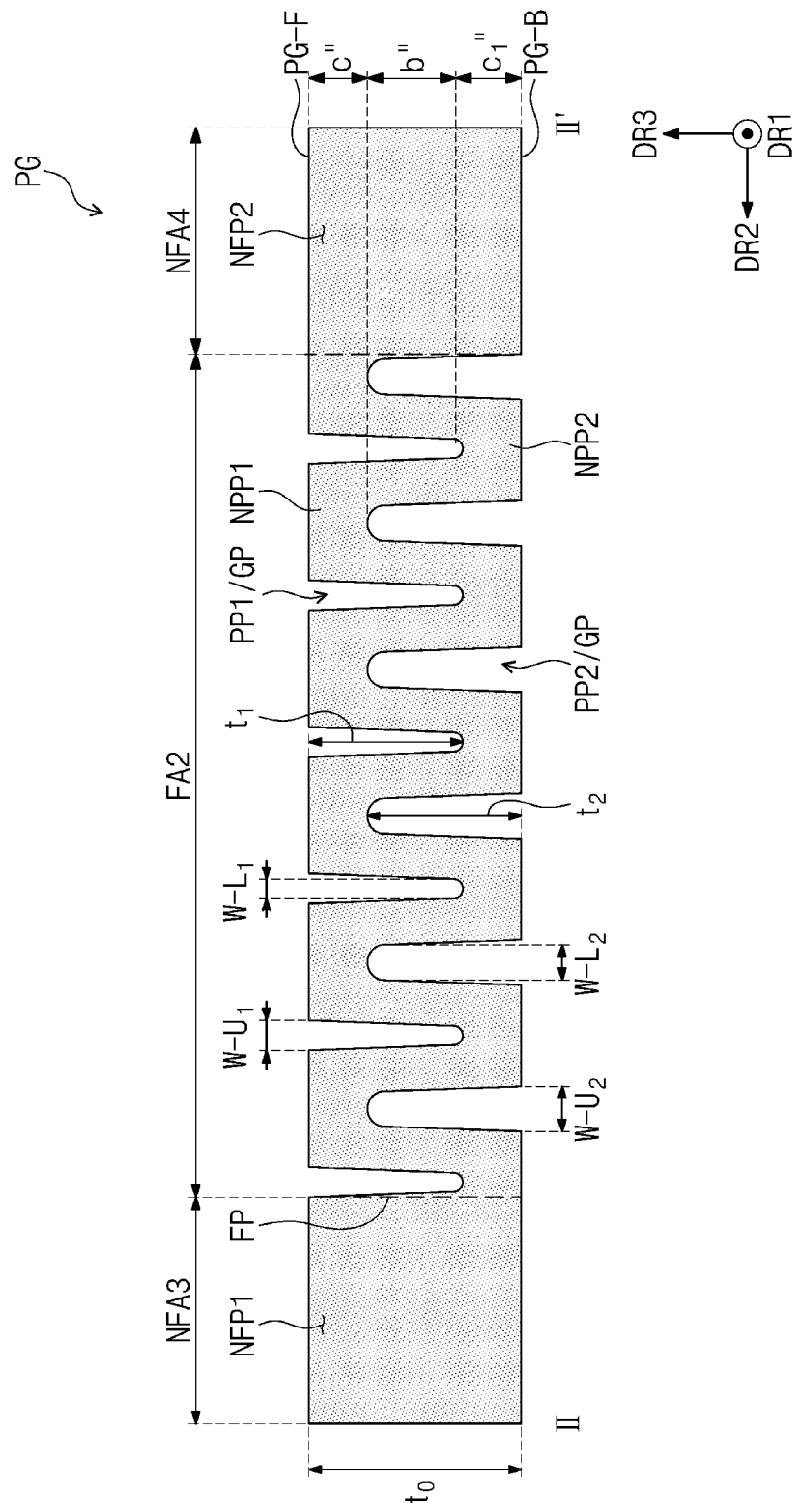

FIGS. 11A and 11B are schematic perspective views illustrating a pattern glass according to embodiments. FIGS. 12A to 12D are schematic cross-sectional views illustrating pattern glass according to embodiments. FIGS. 12A and 12D are schematic cross-sectional views of the pattern glass of FIGS. 11A and 11B.

Referring to FIGS. 11A and 12D, similarly to FIGS. 10A to 10C, the first pattern part PP1 and the second pattern part PP2 of the pattern glass PG may be arranged to be asymmetric to each other in the third direction DR3. For example, the first pattern part PP1 and the second pattern part PP2 may not be arranged at the same position along the second direction DR2. In the third direction DR3, the first pattern part PP1 may be arranged at a position symmetrical to the second non-pattern part NPP2, and the second pattern part PP2 may be arranged at a position symmetrical to the first non-pattern part NPP1. For example, in the second direction DR2, the first pattern part PP1 may be arranged at the same position as the second non-pattern part NPP2, and the second pattern part PP2 may be arranged at the same position as the first non-pattern part NPP1.

Referring to FIG. 11B, the first pattern part PP1 and the second pattern part PP2 of the pattern glass PG may be arranged to be asymmetrical to each other in the second direction DR2. For example, the first pattern part PP1 and the second pattern part PP2 may not be arranged at the same position along the first direction DR1. In the second direction DR2, the first pattern part PP1 may be arranged at the same position as the second non-pattern part NPP2, and the second pattern part PP2 may be arranged at the same position as the first non-pattern part NPP1.

Referring to FIGS. 12A to 12D, unlike FIGS. 10A to 10C, the sum of the thickness t1 of the groove pattern included in the first pattern part and the thickness t2 of the groove pattern included in the second pattern part may be greater than the total thickness t0 of the pattern glass PG. The pattern glass PG may not have the symmetry axis SyX. In case that the sum of the thickness t1 of the groove pattern of the first pattern part and the thickness t2 of the groove pattern of the second pattern part is greater than the thickness t0 of the pattern glass PG, it is possible to prevent or mitigate the cracking phenomenon by absorbing external shock more effectively.

The groove patterns included in the first pattern parts PP1 may all have the same thickness t1. The thickness t2 of all groove patterns included in the second pattern parts PP2 may be the same. The thickness t1 of the groove pattern included in the first pattern part PP1 and the thickness t2 of the groove pattern included in the second pattern part PP2 may be the same or different.

The first pattern part PP1 and the second pattern part PP2 adjacent to each other may be spaced apart from each other by a second interval a". A third interval b" may be provided from the bottom surface of the groove pattern included in the first pattern part PP1 to the bottom surface of the second pattern part PP2. The third interval b" may mean an interval at which the first pattern part PP1 and the second pattern part PP2 intersect.

In an example of the disclosure, in case that the aspect ratio of the first pattern part PP1 and the second pattern part PP2 is set to a"/b", the aspect ratio a"/b" may be in a range of about 0.02 to about 0.5.

In an example of the disclosure, a distance P1 (hereinafter, a first pitch) between the first pattern parts PP1 adjacent to each other may be in a range of about 100 μm to about 2000 The first pattern part PP1 may be repeatedly arranged at intervals in a range of about 100 μm to about 2000 μm. A distance P2 (hereinafter, second pitch) between the adjacent second pattern parts PP2 may be in a range of about 100 μm to about 2000 μm. The second pattern part PP2 may be repeatedly arranged at intervals in a range of about 100 μm to about 2000 μm. The first pitch P1 and the second pitch P2 may be the same or different from each other.

A length obtained by subtracting the thickness t2 of the groove pattern GP included in the second pattern part PP2 from the thickness t0 of the entire pattern glass PG may have a fourth interval c". A length obtained by subtracting the thickness t1 of the groove pattern GP included in the first pattern part PP1 from the thickness t0 of the entire pattern glass PG may have a fifth interval c1". In an example of the disclosure, the fourth interval c" may be greater than the fifth interval c1". As the fourth interval c" increases, the impact resistance against external impact may be improved. The fourth interval c" may be in a range of about 10 μm to about 300 The fifth interval c1" may be in a range of about 5 μm to about 300 μm.

Referring to FIG. 12A, in case that the first pattern part PP1 and the second pattern part PP2 include the groove pattern GP having the same thickness (t1=t2), the fourth interval c" and the fifth interval c1" may be equal to each other.

On the other hand, in case that the first pattern part PP1 and the second pattern part PP2 include the groove pattern GP of different thickness (t1≠t2), the fourth interval c" and the fifth interval c1" may be different. Referring to FIG. 12B, in case that the thickness t1 of the groove pattern included in the first pattern part PP1 is greater than the thickness t2 of the groove pattern included in the second pattern part PP2, the fourth interval c" may be greater than the fifth interval c1". Referring to FIG. 12C, in case that the thickness t2 of the groove pattern included in the second pattern part PP2 is greater than the thickness t1 of the groove pattern included in the first pattern part PP1, the fourth interval c" may be smaller than the fifth interval c1".

In an example of the disclosure, referring to FIGS. 12B and 12C, as the third interval b" is larger, in case that the pattern glass PG is folded, the folding axis FdX, which may be an axis of the first pattern part PP1 and the second pattern part PP2, may gradually change from a diagonal line to a vertical line. For example, in FIG. 12B where the relatively first pattern part PP1 and the second pattern part PP2 intersect small, the third interval b" is relatively small, and the folding axis FdX of the first pattern part PP1 and the second pattern part PP2 may be drawn diagonally. On the other hand, in FIG. 12C where the relatively first pattern part PP1 and the second pattern part PP2 largely intersect, the third interval b" is relatively large, and the folding axis FdX of the first pattern part PP1 and the second pattern part PP2 may be drawn as a vertical line.

In an example of the disclosure, referring to FIG. 12D, the pattern glass PG may be arranged such that the first pattern part PP1 and the second pattern part PP2 are asymmetric to each other in the third direction DR3, and the same description as in FIG. 8D may be applied except that the sum of the thickness t1 of the groove pattern included in the first pattern part and the thickness t2 of the groove pattern included in the second pattern part is greater than the total thickness t0 of the pattern glass PG. Although it is illustrated that the thicknesses of the first pattern parts PP1 and the second pattern parts PP2 are the same (t1=t2) in FIG. 12D, the disclosure is not limited thereto. For example, as shown in FIGS. 12B and 12C, the thicknesses of the first pattern parts PP1 and the second pattern parts PP2 may be different from each other, or only some of them may be different.

In one embodiment, in case that the first pattern part PP1 and the second pattern part PP2 are arranged to be asymmetric to each other in the third direction DR3, the size of the groove pattern GP included in the first pattern part PP1 and the size of the groove pattern GP included in the second pattern part PP2 may be different from each other. The first width W-U1 of the first pattern part PP1 may be smaller than the first width W-U2 of the second pattern part PP2, and the second width W-L1 of the first pattern part PP1 may be smaller than the second width W-L2 of the second pattern part PP2. Although not shown, the first width W-U1 of the first pattern part PP1 may be greater than the first width W-U2 of the second pattern part PP2, and the second width W-L1 of the first pattern part PP1 may be greater than the second width W-L2 of the second pattern part PP2.

Figure 13A:
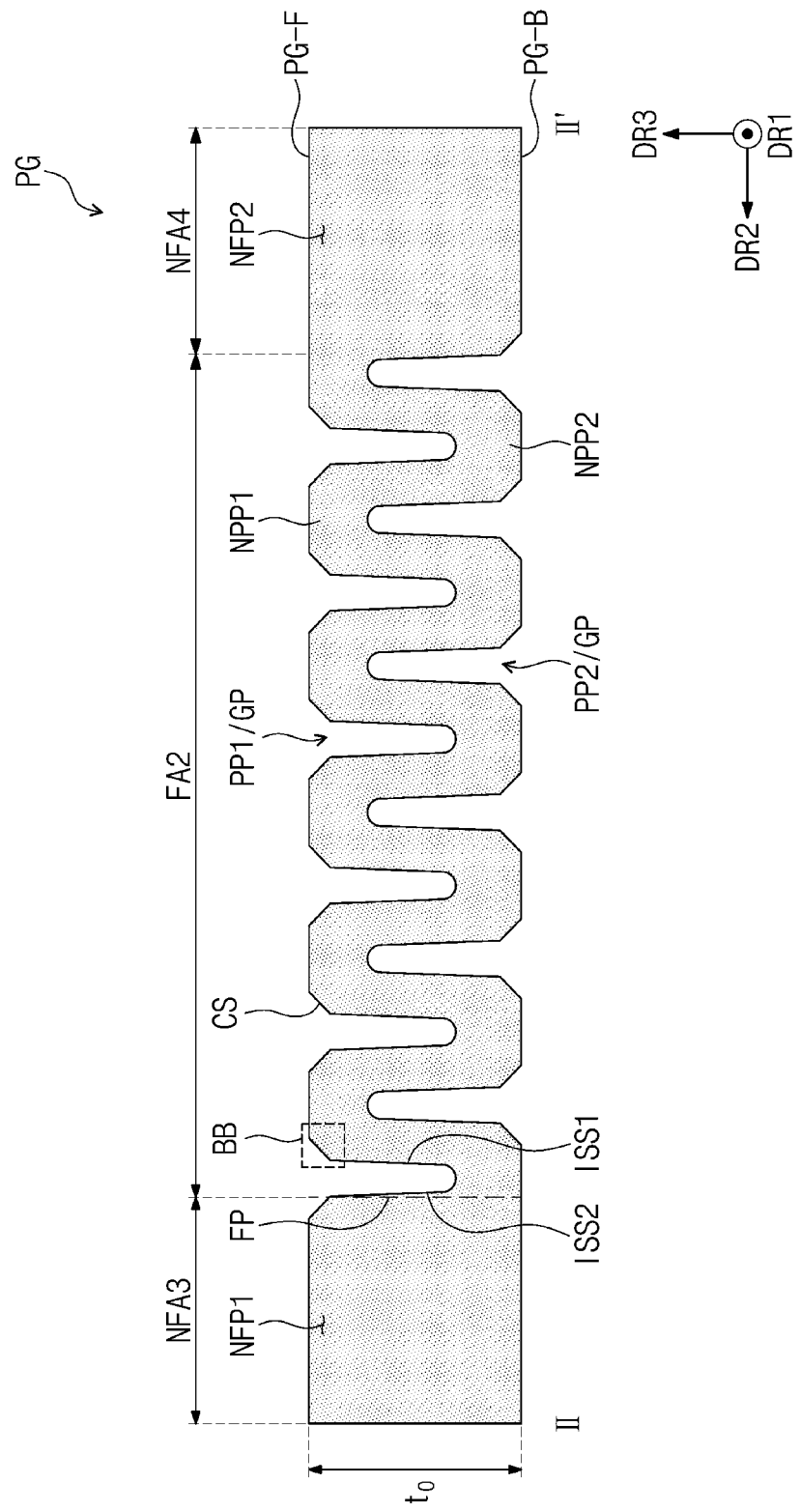
FIG. 13A is a schematic cross-sectional view showing a pattern glass according to embodiments.
Figure 13B:
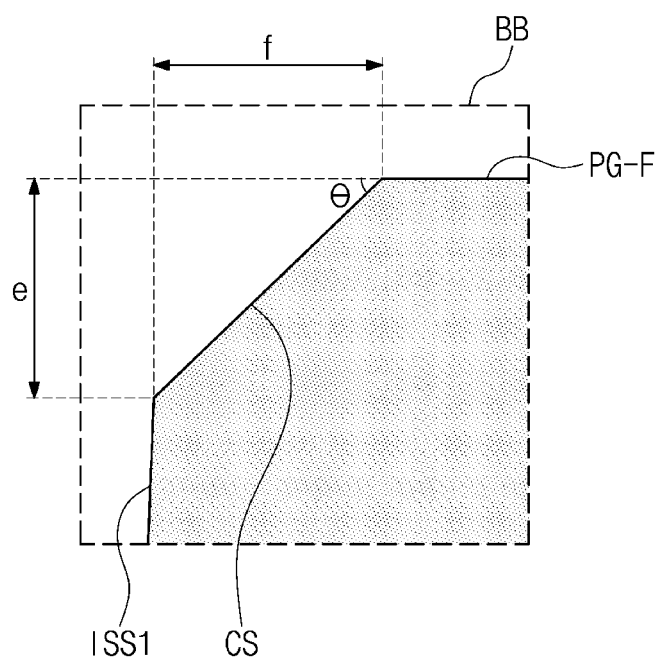
FIG. 13B is an enlarged schematic cross-sectional view of a portion BB shown in FIG. 13A.

FIG. 13A is a schematic cross-sectional view showing a pattern glass according to embodiments. FIG. 13B is an enlarged schematic cross-sectional view of a portion BB shown in FIG. 13A.

In the pattern glass PG according to an embodiment, the first pattern part PP1 and/or the second pattern part PP2 may further include a chamfered surface CS cut at a first angle θ in the corner area formed by the inner surface ISS1 or ISS2 of the groove pattern GP and one surface or a surface of the pattern glass PG-F or PG-B. The chamfered surface CS may have a flat shape. However, the disclosure is not limited thereto, and the chamfered surface CS may have a round shape. As an example of the disclosure, the first angle θ may be in a range of about 5 degrees to about 85 degrees. In case that the first angle θ is about 45 degrees, the first length e of the chamfered surface and the second length f of the chamfered surface may be the same (e=f). In case that the first angle θ is less than about 45 degrees, the first length e of the chamfered surface may be shorter than the second length f of the chamfered surface (e<f). In case that the first angle θ is greater than about 45 degrees, the first length e of the chamfered surface CS may be longer than the second length f of the chamfered surface (e>f). The first length e and the second length f may be about 5 μm to about 45 μm, respectively. The first length e and the second length f of the chamfered surface mean the remaining two sides of a right triangle including the chamfered surface CS as a hypotenuse.

On the other hand, although the pattern glass PG is illustrated as including a chamfered surface CS in case that the first pattern part PP1 and the second pattern part PP2 intersect, the disclosure is not limited thereto, and each of the first pattern part PP1 and the second pattern part PP2 may include a chamfered surface CS regardless of a location, size, or the like within the spirit and the scope of the disclosure. For example, any one of the first pattern part PP1 and/or the second pattern part PP2 illustrated in FIGS. 7A and 12D may include a chamfered surface CS. The chamfered surface CS may be included in only a part of the first pattern parts PP1 or may be included only in a part of the second pattern parts PP2.

FIGS. 14A to 16B are schematic plan views of a pattern glass according to an embodiment. FIGS. 17A and 17B are schematic perspective views illustrating a part of a pattern glass PG according to embodiments. FIGS. 17A and 17B are schematic perspective views of a portion corresponding to the folding area FA2 in the pattern glass PG. However, among the components shown in FIGS. 14A to 17B, the same reference numerals are used for the same components as those shown in FIGS. 7A to 12D, and detailed descriptions thereof will be omitted, and differences will be described.

The pattern glass PG according to an embodiment may further include a first pattern line CL1 and/or a second pattern line CL2. The first pattern line CL1 and the second pattern line CL2 may be disposed on one surface or a surface PG-F or PG-B of the pattern glass PG to correspond to the folding area FA2, respectively. The first pattern line CL1 and the second pattern line CL2 may not be disposed in the non-folding areas NFA3 and NFA4. Since the first pattern line CL1 and the second pattern line CL2 are disposed on one surface or a surface facing each other, in FIGS. 14A to 16B, the first pattern line CL1 is indicated by a solid line, and the second pattern line CL2 is indicated by a dotted line.

The first pattern line CL1 may be disposed on the upper surface PG-F of the pattern glass to correspond to the folding area FA2. The first pattern line CL1 may divide groove patterns included in the first pattern part PP1. The first pattern part PP1 may include groove patterns arranged to be spaced apart from each other in the first direction DR1 by the first pattern line CL1. For example, in case that n first pattern lines CL1 passing through the first pattern part PP1 are disposed, the first pattern part PP1 may include n+1 groove patterns. The number of first pattern lines CL1 may be 1 to 30.

The second pattern line CL2 may be disposed on the lower surface PG-B of the pattern glass to correspond to the folding area FA2. The second pattern line CL2 may divide groove patterns included in the second pattern part PP2. The second pattern part PP2 may include groove patterns arranged to be spaced apart from each other in the first direction DR1 by the second pattern line CL2. For example, in case that n second pattern lines CL2 passing through the second pattern part PP2 are disposed, the second pattern part PP2 may include n+1 groove patterns. The number of second pattern lines CL2 may be 1 to 40.

Figure 14A:
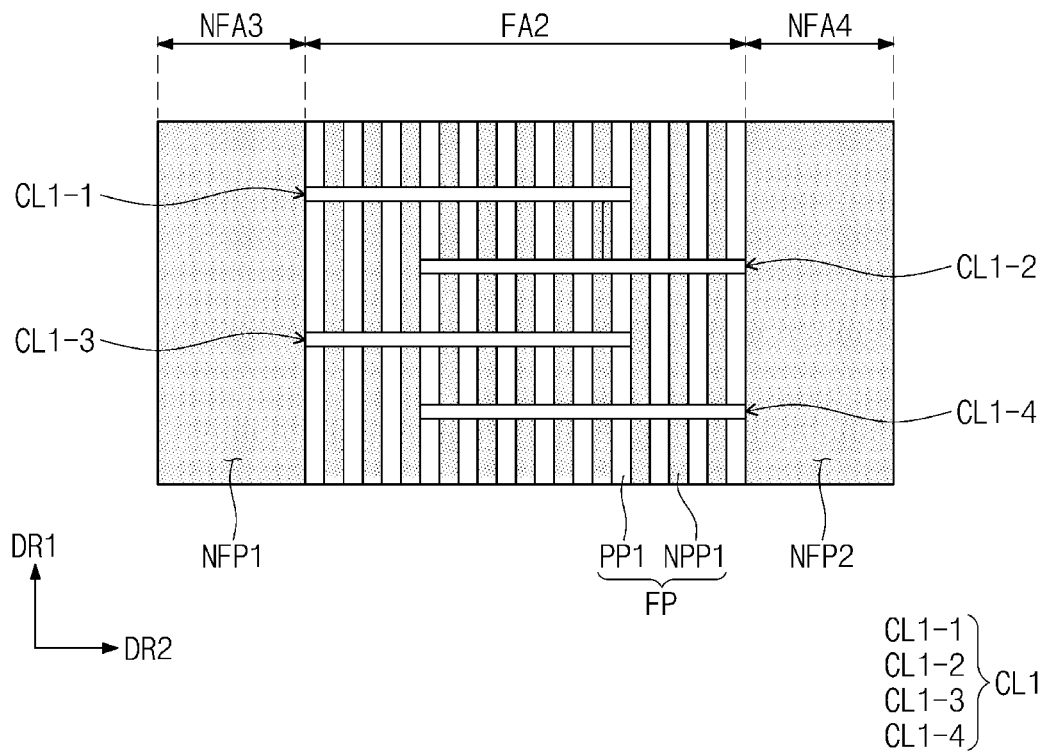
FIGS. 14A to 16B are schematic plan views of a pattern glass according to an embodiment.
Figure 14B:
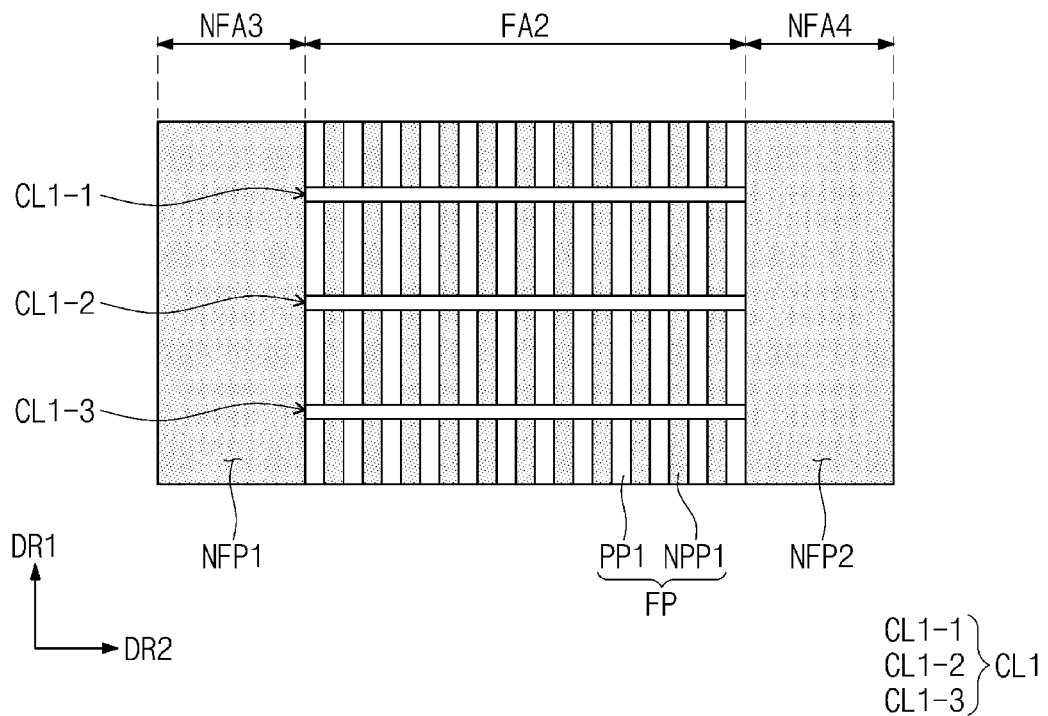

Referring to FIGS. 14A and 14B, the pattern glass PG according to an embodiment may include the first pattern line CL1 and may not include the second pattern line.

Referring to FIG. 14A, the pattern glass PG may include first pattern lines CL1 CL1-1, CL1-2, CL1-3, and CL1-4. Each of the first pattern lines CL1-1, CL1-2, CL1-3, and CL1-4 may have a stripe shape extending in the second direction DR2. The first pattern lines CL1-1, CL1-2, CL1-3, and CL1-4 may be disposed to form a right angle with the first pattern part PP1, respectively. The first pattern lines CL1-1, CL1-2, CL1-3, and CL1-4 may be disposed at different positions along the first direction DR1. The first pattern lines CL1-1, CL1-2, CL1-3, and CL1-4 may be disposed only in a portion of the folding area FA2 along the second direction DR2. Some or a number of the first pattern lines CL1-1 and CL1-3 may be disposed along the second direction DR2 at the boundary between the first non-folding area NFA3 and the folding area FA2. Other portions CL1-2 and CL1-4 of the first pattern lines may be disposed in a direction opposite to the second direction DR2 at the boundary between the second non-folding area NFA4 and the folding area FA2.

However, the disclosure is not limited thereto, and referring to FIG. 14B, the first pattern lines CL1-1, CL1-2, and CL1-3 are disposed over the entire area of the folding area FA2 along the second direction DR2.

Figure 14C:
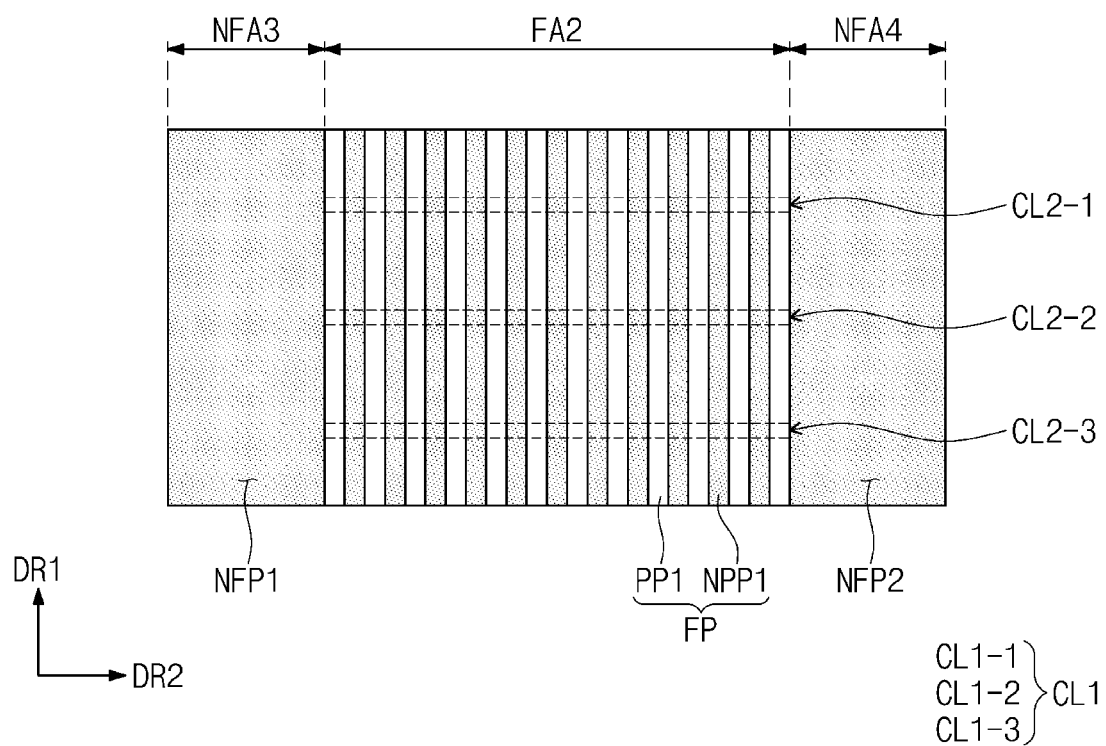

Referring to FIG. 14C, the pattern glass PG according to an embodiment may include the second pattern line CL2 and may not include the first pattern line. The pattern glass PG may include second pattern lines CL2, CL2-1, CL2-2, and CL2-3. Each of the second pattern lines CL2-1, CL2-2, and CL2-3 may have a stripe shape extending in the second direction DR2. The second pattern lines CL2-1, CL2-2, and CL2-3 may be disposed to form a right angle with the second pattern part PP2, respectively. The second pattern lines CL2-1, CL2-2, and CL2-3 may be disposed in the entire area of the folding area FA2 in the second direction DR2. Although not illustrated, the second pattern line CL2 may be disposed only in a portion of the folding area FA2 along the second direction DR2.

Referring to FIGS. 15A to 16B, the pattern glass PG according to an embodiment may include a first pattern line CL1 and a second pattern line CL2 at the same time. The first pattern line CL1 and the second pattern line CL2 may be disposed at different positions in the first direction DR1. However, the disclosure is not limited thereto.

Figure 15A:
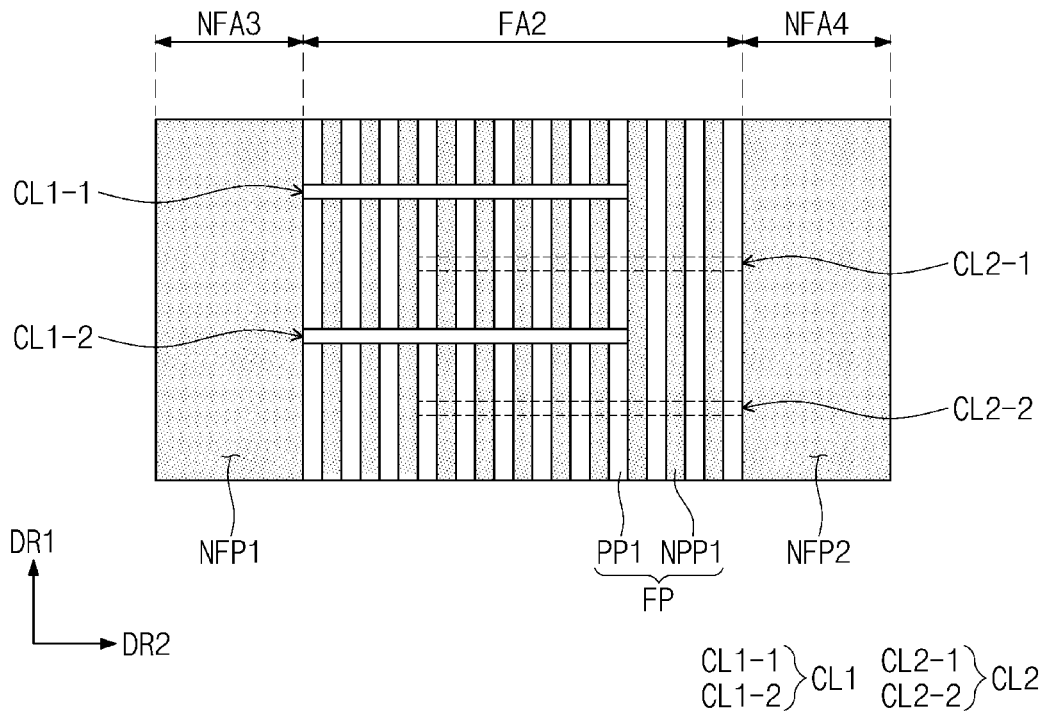

Referring to FIG. 15A, the pattern glass PG may include first pattern lines CL1 (CL1-1 and CL1-2), and may include second pattern line CL2 (CL2-1 and CL2-2). The first pattern lines CL1-1 and CL1-2 and the second pattern lines CL2-1 and CL2-2 may each have a stripe shape extending in the second direction DR2. The first pattern lines CL1-1 and CL1-2 and the second pattern lines CL2-1 and CL2-2 may be disposed at different positions along the first direction DR1. The first pattern line CL1 and the second pattern line CL2 may be alternately disposed along the first direction DR1.

The first pattern lines CL1-1 and CL1-2 and the second pattern lines CL2-1 and CL2-2 may be disposed only in a portion of the folding area FA2 along the second direction DR2. The first pattern lines CL1-1 and CL1-2 may be disposed along the second direction DR2 at the boundary between the first non-folding area NFA3 and the folding area FA2. The second pattern lines CL2-1 and CL2-2 may be disposed in a direction opposite to the second direction DR2 at the boundary between the second non-folding area NFA4 and the folding area FA2.

Figure 15B:
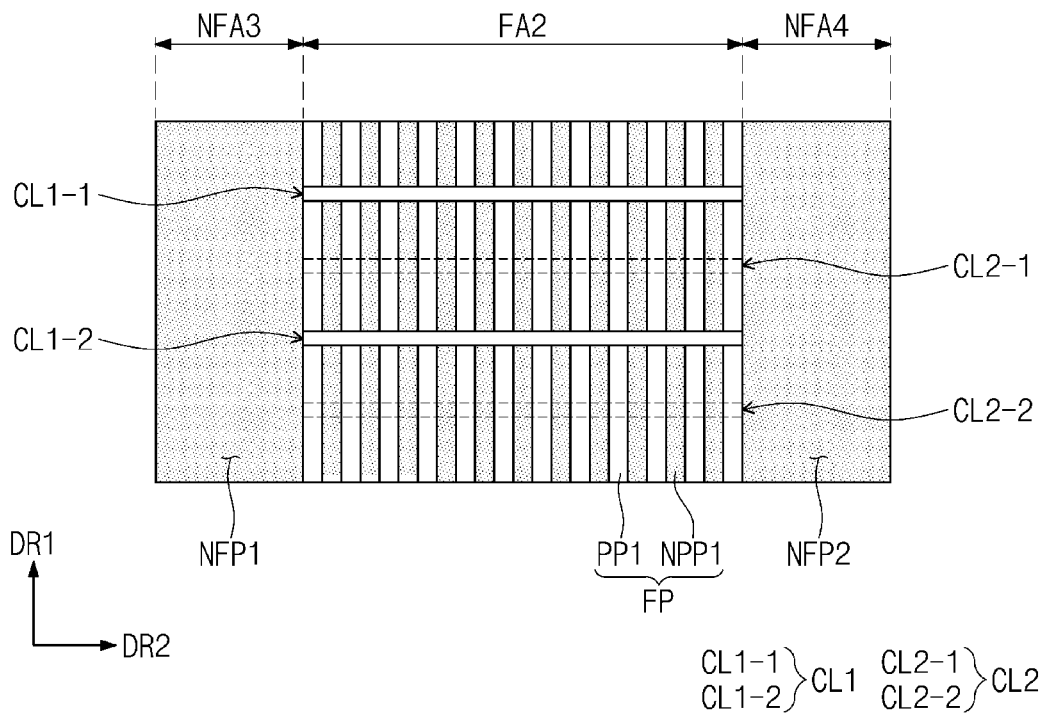

However, the disclosure is not limited thereto, and referring to FIG. 15B, the first pattern lines CL1-1 and CL1-2 and the second pattern lines CL2-1 and CL2-2 may be disposed over the entire area of the folding area FA2 in the second direction DR2.

Figure 15C:
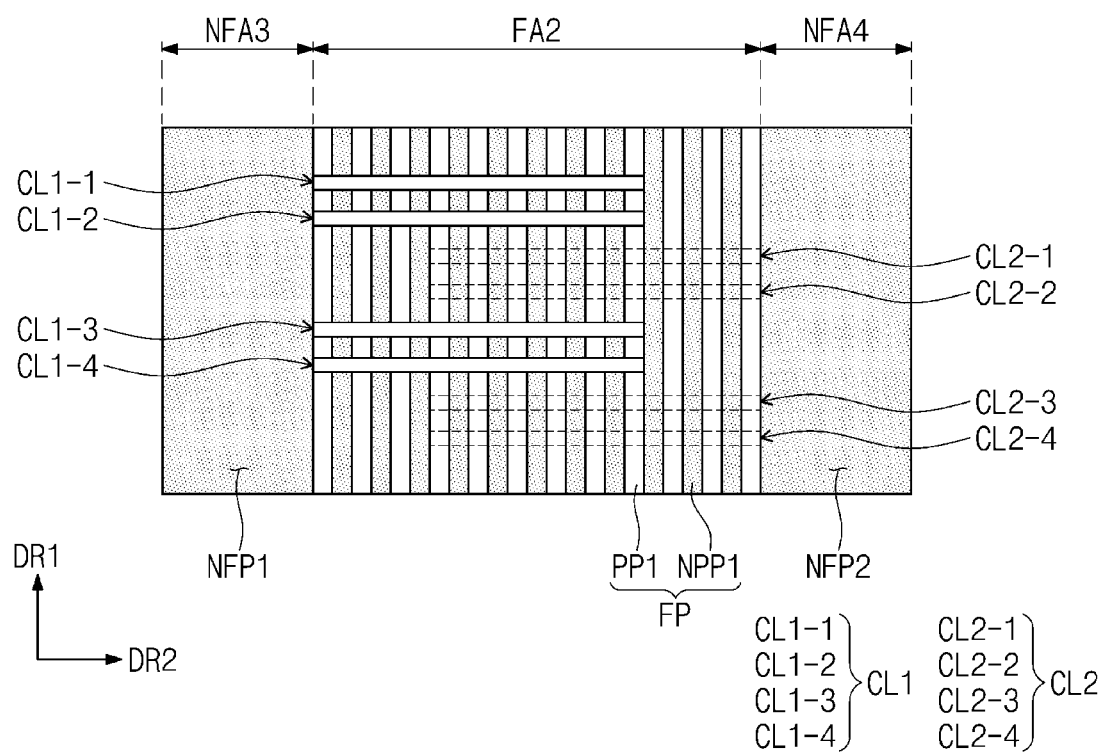

Referring to FIG. 15C, the first pattern line CL1 and the second pattern line CL2 may be alternately disposed two by two along the first direction DR1. For example, along the first direction DR1, the (2-4)-th pattern line CL2-4, the (2-3)-th pattern line CL2-3, the (1-4)-th pattern line CL1-4, the (1-3)-th pattern line CL1-3, the (2-2)-th pattern line CL2-2, the (2-1)-th pattern line CL2-1, the (1-2)-th pattern line CL1-2, and the (1-1)-th pattern line CL1-1 may be sequentially disposed.

Figure 16A:
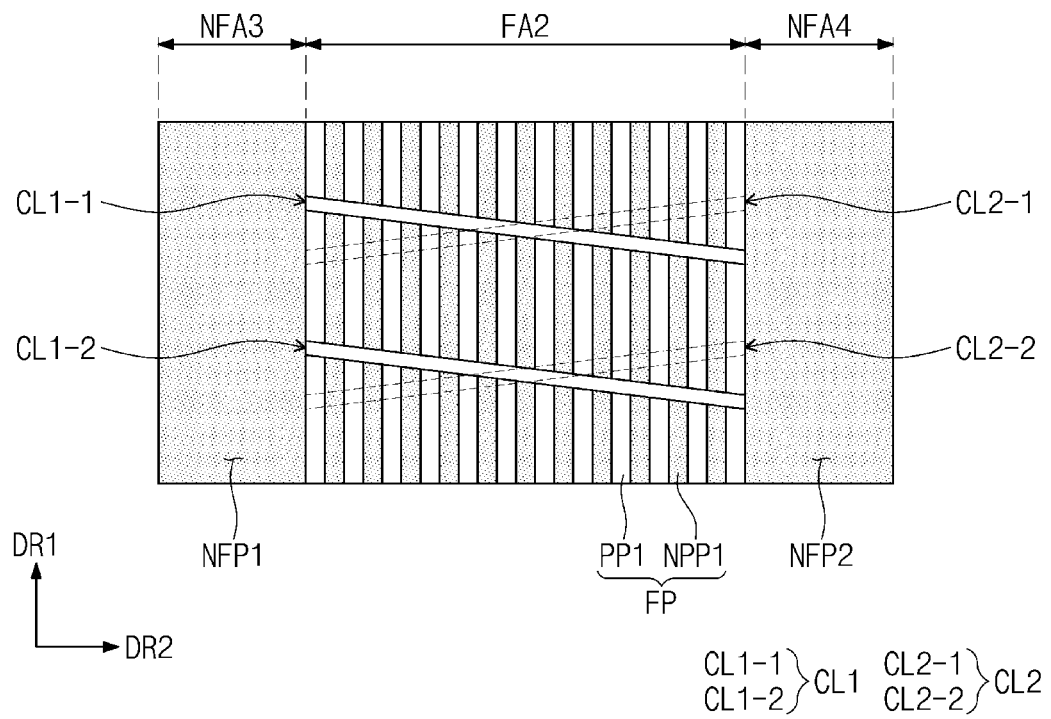
Figure 16B:
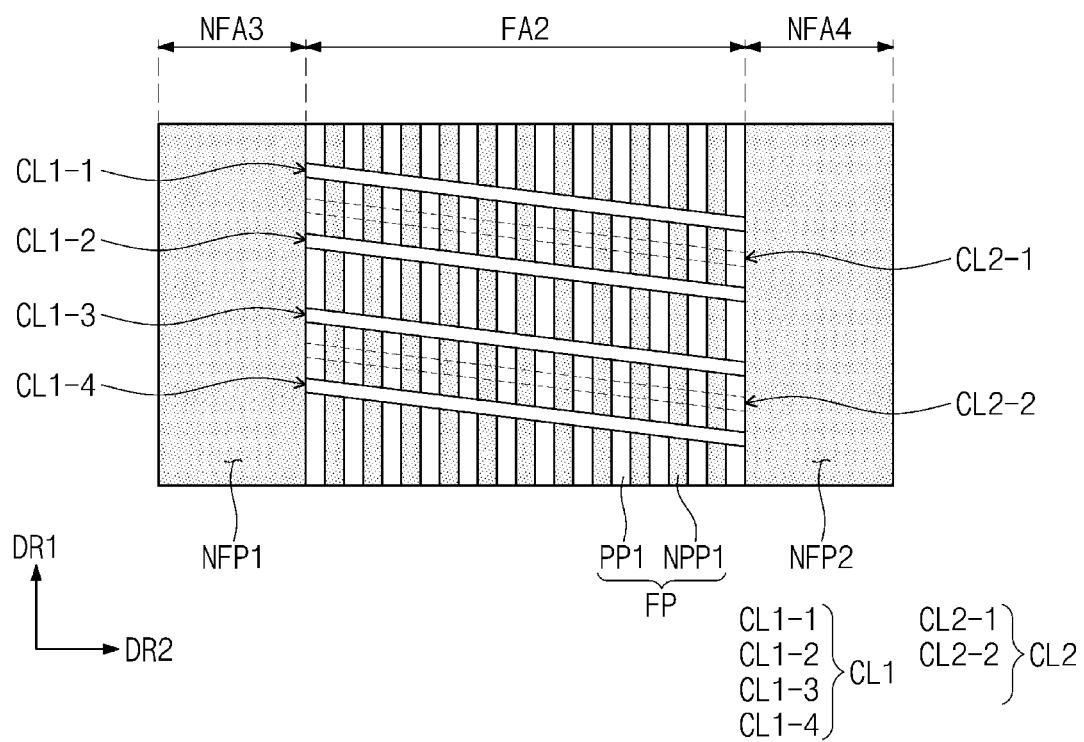
Figure 17A:
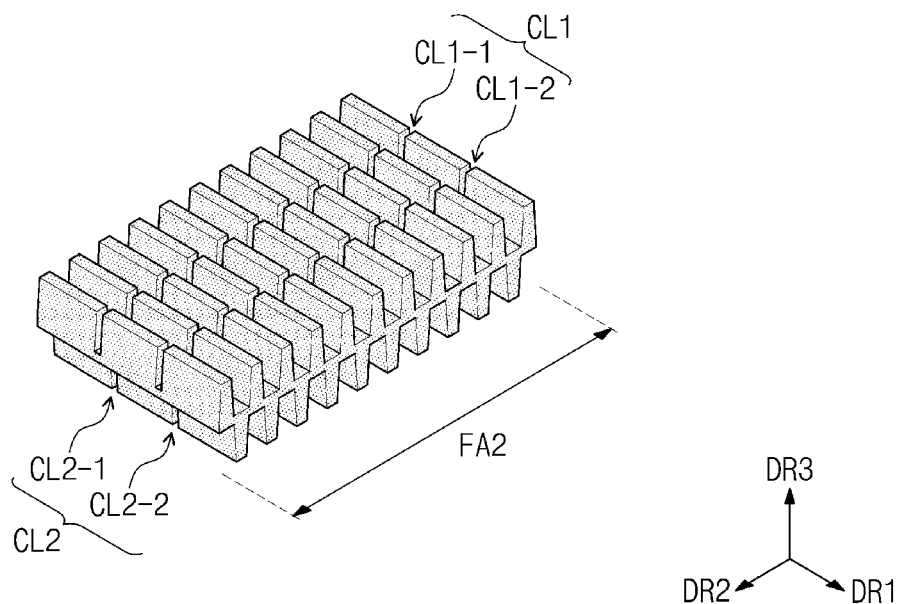
FIGS. 17A and 17B are schematic perspective views illustrating a part of a pattern glass according to embodiments.
Figure 17B:
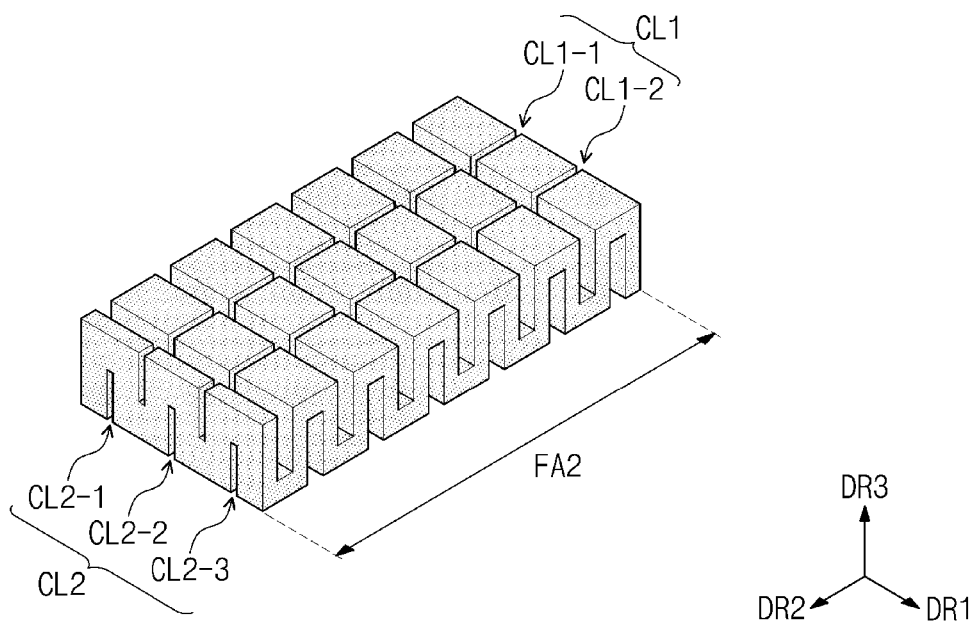

FIGS. 16A and 16B, the first pattern line CL1 and the second pattern line CL2 may have a stripe shape extending in a diagonal direction between the first direction DR1 and the second direction DR2; or in a diagonal direction between the direction opposite to the first direction DR1 and the second direction DR2. The first pattern line CL1 may be disposed to form an angle of less than about 90 degrees with the first pattern part PP1. The second pattern line CL2 may be disposed to form an angle of less than about 90 degrees with the second pattern part PP2.

FIGS. 17A and 17B are schematic perspective views illustrating a pattern glass PG including a first pattern line CL1 and a second pattern line CL2 according to an embodiment. In order to show both the first pattern line CL1 and the second pattern line CL2, only the folding area FA2 of the pattern glass PG is shown. However, this is an example, and the shapes and positions of the first pattern and the second pattern are not limited thereto.

According to one embodiment, the glass window may include a pattern part including groove patterns provided on both sides corresponding to the folding area and a non-pattern part disposed adjacent to the pattern part in correspondence to the folding area, so that it is possible to reduce stress during folding and improve impact resistance.

According to one embodiment, the glass window may include a pattern part including groove patterns provided on both sides corresponding to the folding area and a non-pattern part disposed adjacent to the pattern part in correspondence to the folding area, so that it is possible to reduce stress during folding and improve impact resistance.

Although embodiments have been described, it is to be understood that the disclosure should not be limited to these embodiments but various changes and modifications may be made by one of ordinary skill in the art within the spirit and scope of the disclosure as hereinafter claimed.

What is claimed is:

1. A glass window comprising:
   a first non-folding area, a folding area, and a second non-folding area disposed in a first direction;
   a first filling layer;
   a pattern glass disposed below the first filling layer, the pattern glass including an upper surface and a lower surface opposite to the upper surface, the pattern glass comprising a folding part corresponding to the folding area and a non-folding part corresponding to the first non-folding area and the second non-folding area; and
   a second filling layer disposed below the pattern glass,
   wherein each of the first filling layer and the second filling layer covers the folding part and the non-folding part, and includes at least one of phenylene, polyethylene-terephthalate (PET), polyimide (PI), polyamide (PAI), polyethylene naphthalate (PEN), and polycarbonate (PC),
   wherein the folding part comprises:
   at least one first pattern part including a groove pattern disposed on an upper surface of the folding area;
   a first non-pattern part adjacent to the at least one first pattern part of the folding area;
   at least one second pattern part including a groove pattern disposed on a lower surface of the folding area; and
   a second non-pattern part adjacent to the at least one second pattern part of the folding area; wherein
   the groove pattern of the at least one first pattern part and the at least one second pattern part comprises a bottom surface, a first inner surface, and a second inner surface,
   the first inner surface spaced apart from the second inner surface by the bottom surface, and
   the first inner surface and the second inner surface each extend in a direction intersecting a third direction corresponding to a thickness direction and perpendicular to the first direction.

2. The glass window of claim 1, wherein the at least one first pattern part and the at least one second pattern part are spaced apart from each other in a third direction perpendicular to the first direction.

3. The glass window of claim 1, wherein
   the at least one first pattern part includes first pattern parts,
   the at least one second pattern part includes second pattern parts, and
   the first pattern parts and second pattern parts extend in the first direction and are spaced apart from each other in a second direction perpendicular to the first direction.

4. The glass window of claim 3, wherein
   the first pattern parts comprise a groove pattern having a same thickness, and
   the second pattern parts comprise groove patterns having a same thickness.

5. The glass window of claim 4, wherein the at least one first pattern part and the at least one second pattern part comprise a groove pattern having a same thickness.

6. The glass window of claim 4, wherein the at least one first pattern part comprises a groove pattern having a thickness greater than a thickness of the groove pattern included in the at least one second pattern part.

7. The glass window of claim 4, wherein the at least one second pattern part comprises a groove pattern having a thickness greater than a thickness of the groove pattern included in the at least one first pattern part.

8. The glass window of claim 3, wherein
at least one of the first pattern parts comprises a groove pattern having a different thickness, and
at least one of the second pattern parts comprises a groove pattern having a different thickness.

9. The glass window of claim 8, wherein
three consecutive first pattern parts among the first pattern parts comprise groove patterns having different thicknesses, and
three consecutive second pattern parts among the second pattern parts comprise groove patterns having different thicknesses.

10. The glass window of claim 8, wherein
three successive first pattern parts among the first pattern parts comprise a groove pattern having a thickness different from a thickness of an adjacent first pattern part, and comprise a groove pattern having a same thickness as another first pattern part, and
three successive second pattern parts among the second pattern parts comprise a groove pattern having a thickness different from a thickness of an adjacent second pattern part, and comprise a groove pattern having a same thickness as another second pattern part.

11. The glass window of claim 8, wherein
the at least one first pattern part and the at least one second pattern part are disposed at a same position in a second direction perpendicular to the first direction, and
the first non-pattern part and the second non-pattern part are disposed at a same position.

12. The glass window of claim 1, wherein the groove pattern of the at least one pattern part and the at least one second pattern part comprising the bottom surface and the first inner surface and the second inner surface have a shape recessed from the upper surface or the lower surface and defining the groove pattern.

13. The glass window of claim 12, wherein a thickness of the pattern glass is in a range of about 100 μm to about 1000 μm.

14. The glass window of claim 13, wherein
the at least one first pattern part and the second non-pattern part are disposed at a same position in a second direction perpendicular to the first direction, and
the at least one second pattern part and the first non-pattern part are disposed at a same position.

15. The glass window of claim 14, wherein a sum of the thickness of the groove pattern included in the at least one first pattern part and the thickness of the groove pattern included in the at least one second pattern part is greater than the thickness of the pattern glass.

16. The glass window of claim 15, wherein
an aspect ratio (a"/b") of the pattern glass is in a range of about 0.02 to about 0.5, where
a" is an interval between the at least one first pattern part and the at least one second pattern part adjacent to each other, and
b" is an interval from the bottom surface of the groove pattern included in the at least one first pattern part to the bottom surface of the at least one second pattern part.

17. The glass window of claim 15, wherein an interval c" obtained by subtracting the thickness of the groove pattern included in the at least one second pattern part from the thickness of the pattern glass is greater than an interval c1" obtained by subtracting the thickness of the groove pattern included in the at least one first pattern part from the thickness of the pattern glass.

18. The glass window of claim 17, wherein
the interval c" is in a range of about 10 μm to about 300 μm, and
the interval c1" is in a range of about 5 μm to about 300 μm.

19. The glass window of claim 12, further comprising:
a chamfered surface cut at a first angle θ in a corner area formed by the first inner surface and the upper surface or lower surface of the pattern glass,
wherein the first angle θ is in a range of about 5 degrees to about 85 degrees.

20. The glass window of claim 19, wherein a first length and a second length forming a right triangle with the chamfered surface are in a range of about 5 μm to about 45 μm, respectively.

21. The glass window of claim 1, further comprising at least one of:
at least one first pattern line disposed on the upper surface of the pattern glass corresponding to the folding area and dividing a groove pattern included in the at least one first pattern part; and
at least one second pattern line disposed on the lower surface of the pattern glass corresponding to the folding area and dividing a groove pattern included in the at least one second pattern part.

22. The glass window of claim 21, wherein
the at least one first pattern line includes first pattern lines,
the at least one second pattern line includes second pattern lines, and
the first pattern lines and the second pattern lines are disposed only in a part of the folding area in a second direction perpendicular to the first direction.

23. The glass window of claim 21, wherein
the at least one first pattern line includes first pattern lines,
the at least one second pattern line includes second pattern lines, and
the first pattern lines and second pattern lines are disposed in all of the folding area in a second direction perpendicular to the first direction.

24. The display device of claim 1, further comprising an anti-reflective layer disposed between the second filling layer and a display module.

25. The display device of claim 24, further comprises an adhesive film directly contacting the anti-reflective layer and the display module.

26. A display device comprising:
a first non-folding area, a folding area, and a second non-folding area disposed in a first direction;
a display module that displays an image; and
a glass window disposed on the display module,
wherein the glass comprises:
a pattern glass having an upper surface and a lower surface facing the upper surface, the pattern glass comprising a folding part corresponding to the folding area and a non-folding part corresponding to the first non-folding area and the second non-folding area; and
a filling layer covers the folding part and the non-folding part, and includes at least one of phenylene, polyethyleneterephthalate (PET), polyimide (PI), polyamide (PAI), polyethylene naphthalate (PEN), and polycarbonate (PC),
wherein the folding part comprises:
at least one first pattern part including a groove pattern disposed on an upper surface of the folding area;

a first non-pattern part adjacent to the at least one first pattern part of the folding area;

at least one second pattern part including a groove pattern disposed on a lower surface of the folding area; and a second non-pattern part adjacent to the at least one second pattern part of the folding area; wherein the groove pattern of the at least one first pattern part and the at least one second pattern part comprises a bottom surface, a first inner surface, and a second inner surface, the first inner surface spaced apart from the second inner surface by the bottom surface, and the first inner surface and the second inner surface each extend in a direction intersecting a third direction corresponding to a thickness direction and perpendicular to the first direction.

27. The display device of claim 26, wherein the filling layer disposes on the upper surface and the lower surface of the pattern glass, respectively, and the filling layer fills the groove pattern of the first pattern part and the second pattern part.

28. The display device of claim 26, wherein the glass window further comprises a protective layer disposed on the upper surface of the pattern glass.

29. The display device of claim 26, wherein the at least one first pattern part includes first pattern parts, the at least one second pattern part includes second pattern parts, and the first pattern parts and second pattern parts extend in the first direction and are spaced apart from each other in a second direction perpendicular to the first direction.

\* \* \* \* \*